US012752227B2

(12) United States Patent
Schmid et al.

(10) Patent No.: US 12,752,227 B2
(45) Date of Patent: Oct. 6, 2026

(54) FILTER SYSTEM COMPRISING FILTER HOUSING, REPLACEABLE FILTER ELEMENT, AND RESONATOR STRUCTURE

(71) Applicant: MANN+HUMMEL GmbH, Ludwigsburg (DE)

(72) Inventors: Daniel Schmid, Sachsenheim (DE); Kevin Kohn, Grossbottwar (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 267 days.

(21) Appl. No.: 18/648,670

(22) Filed: Apr. 29, 2024

(65) Prior Publication Data

US 2024/0269589 A1 Aug. 15, 2024

Related U.S. Application Data

(63) Continuation of application No. PCT/EP2022/077651, filed on Oct. 5, 2022.

(30) Foreign Application Priority Data

Nov. 4, 2021 (DE) ..................... 10 2021 128 679.4

(51) Int. Cl.
*B01D 46/00* (2022.01)
*B01D 46/42* (2006.01)
*B01D 46/52* (2006.01)

(52) U.S. Cl.
CPC ..... *B01D 46/0002* (2013.01); *B01D 46/4236* (2013.01); *B01D 46/52* (2013.01)

(58) Field of Classification Search
None
See application file for complete search history.

(56) References Cited

U.S. PATENT DOCUMENTS 3,740,931 A * 6/1973 Nowicki ................ F02M 35/09 96/419
5,792,247 A 8/1998 Gillingham et al.
2015/0007732 A1 1/2015 Hasenfratz et al.

FOREIGN PATENT DOCUMENTS

CN 207315552 U 5/2018
DE 3429633 A1 2/1986
(Continued)

OTHER PUBLICATIONS

International Search Report in corresponding International Appln. No. PCT/EP2022/077651, Jan. 30, 2023, Rijswijk, Netherlands.
(Continued)

*Primary Examiner* — Richard C Gurtowski

(57) ABSTRACT

A filter system has a filter housing enclosing an interior space. An exchangeable filter element and a resonator structure are arranged in the interior space. The resonator structure has resonator housing elements forming a closed resonator housing enclosing a cavity in an intended state. A partition divides the cavity into a first and a second chamber. The partition has a passage through which the first and second chambers are acoustically coupled. The filter housing has a housing part providing one of the resonator housing elements. The filter element is provided with another one of the resonator housing elements. The filter element has a filter bellows and a cutout penetrating the filter bellows from an inflow side to an outflow side of the filter bellows. The cutout is a resonator housing receptacle. At least one of the resonator housing elements is arranged in the cutout.

15 Claims, 27 Drawing Sheets

(56) References Cited

FOREIGN PATENT DOCUMENTS

| | | | |
|---|---|---|---|
| DE | 102018003414 | A1 | 10/2018 |
| JP | 2007077963 | A | 3/2007 |

OTHER PUBLICATIONS

Office Action in corresponding German Appln. No. 102021128679.4, Jul. 1, 2022, 4 pages, Germany.

* cited by examiner

FILTER SYSTEM COMPRISING FILTER HOUSING, REPLACEABLE FILTER ELEMENT, AND RESONATOR STRUCTURE

CROSS-REFERENCE TO RELATED APPLICATIONS

This application is a continuation application of international application No. PCT/EP2022/077651 having an international filing date of Oct. 5, 2022, and designating the United States, the international application claiming a priority date of Nov. 4, 2021, based on prior filed German patent application No. 10 2021 128 679.4, the entire contents of the aforesaid international application and the aforesaid German patent application being incorporated herein by reference.

BACKGROUND

The invention concerns a filter system with a filter housing which encloses an interior space in which an exchangeable filter element and a resonator structure are arranged, wherein the resonator structure comprises a multi-part resonator housing. Furthermore, the invention concerns a use of a filter element in such a filter system.

CN207315552U discloses an air filter which comprises a top housing part, a filter element, a bottom housing part, and a sound absorber. The top housing part comprises an upper partition, the bottom housing part comprises a lower partition. The upper partition is positioned opposite the lower partition. The upper partition and the lower partition are adapted relative to each other. The cavity which is formed by the top housing part and the bottom housing part is divided into a sound absorber cavity and a filter cavity; the bottom housing part is provided with an air inlet which is in communication with the sound absorber cavity and the top housing part is provided with an air outlet which is in communication with the filter cavity. The filter element is located between the top housing part and the bottom housing part. A through hole is arranged in the lower partition. The sound absorber comprises a curved surface structure and a plurality of sound absorber holes. The bottom housing part comprises ribs which interact with the sound absorber in order to form a sound absorbing inner cavity, wherein the inner cavity of the sound absorber is in communication with the air inlet.

SUMMARY

It is an object of the invention to provide a filter system with a filter housing, which encloses an interior space in which an exchangeable filter element and a resonator structure are arranged, which filter system can be produced in an inexpensive manner.

The aforementioned object is solved according to an aspect of the invention by a filter system with a filter housing which encloses an interior space in which an exchangeable filter element and a resonator structure are arranged, wherein the resonator structure comprises a multi-part resonator housing which, in an embodiment, encloses a cavity which is divided by a partition into two chambers. The partition comprises at least one passage through which the two chambers are acoustically coupled. At least one housing part of the filter housing comprises a resonator housing element and the filter element comprises a resonator housing element, wherein the resonator housing elements in an embodiment form the closed resonator housing.

An embodiment is to be understood in the following as the state in which the filter element is arranged in the filter housing and the filter housing is closed with the exception of inlets and outlets. In an embodiment, the filter system can be put into operation or is already in operation.

In an advantageous manner, the resonator housing element connected to the filter element is exchangeable together with the filter element. By installation or insertion of the filter element into the filter housing, the resonator housing can be formed of the at least two resonator housing elements. In this context, in an embodiment of the filter element, filtering of the fluid and noise damping, for example, of an auxiliary connection outlet, is possible only when the filter element and the filter housing as well as the resonator housing elements of the housing part and of the filter element are adapted relative to each other. In this way, it can be ensured that only suitable filter elements can be installed in the corresponding filter housing, whereby the functionality of a corresponding filter system can be improved and compliance with a quality standard can be facilitated.

According to a beneficial embodiment of the filter system, the multi-part resonator housing can comprise a resonator inlet and a resonator outlet which are coupled to a first chamber, wherein the resonator inlet is arranged in a clean fluid region of the interior space and the resonator outlet is coupled to an auxiliary connection outlet of the filter housing. In this way, filtered fluid can be guided through the first chamber to an auxiliary consumer. In addition, due to the acoustic coupling via the at least one passage in the partition, disturbing noises can be dampened or reduced. In addition, the multi-part resonator housing in an embodiment is closed; the fluid can only flow through the resonator inlet into the resonator housing and flow out of the resonator housing through the resonator outlet. End regions of the partition contact at least one wall of the corresponding resonator housing element, respectively. As an alternative, the partition can be fixedly connected to the corresponding resonator housing element. In this way, the fluid can interact only through the passages of the partition with a fluid column in the second chamber. A seal element can be additionally arranged between the end regions of the partition and the respective wall.

The auxiliary connection outlet can be used, for example, for auxiliary consumers such as compressors. This can be applied, for example, in a brake system of a truck.

According to a beneficial embodiment of the filter system, the partition can be of a single-part or of a multiple-part configuration. In case of a single-part configuration, the partition can be connected to one of the resonator housing elements and can project into the at least one further resonator housing element. In case of a multi-part configuration, the partition elements each can be connected to a respective resonator housing element. In addition, a connection arrangement can connect two neighboring partition elements to each other. In case of a single-part configuration as well as of a multi-part configuration of the partition, at least one partition element of the partition can be connected to one of the resonator housing elements and can project out from the corresponding resonator housing element and, in an embodiment, project into at least another resonator housing element. In case of the multi-part configuration, it would be conceivable also that only connection elements of the connection arrangement project out from the respective resonator housing element.

According to a beneficial embodiment of the filter system, at least two resonator housing elements can be connected to a partition element, respectively, which form the partition in an embodiment. In this context, a fixed or detachable connection can be realized. In addition, a partition element can project into the resonator housing element of another partition element when the dimensions of the partition elements are adapted accordingly.

According to a beneficial embodiment of the filter system, the resonator housing elements into which a partition element projects can have a partition element holder. In this way, a stability of the formed partition can be improved; in addition, joining of a partition element to another resonator housing element can be improved. Furthermore, the partition element holder can comprise guide elements. By means of the guide elements which, for example, can be embodied as a groove, the insertion of the partition element into the corresponding resonator housing element and/or positioning of the partition element and/or positioning of the corresponding housing part and/or positioning of the filter element can be facilitated in an advantageous manner. In this way, the formation of the resonator structure upon installation of the filter element in the filter housing can be facilitated.

According to an embodiment, the filter bellows of the filter element comprises a cutout which forms a filter element-associated resonator housing receptacle in which, in an embodiment, at least one resonator housing element is arranged. The cutout penetrates the filter bellows of the filter element. In this context, the resonator housing element which projects into the filter element-associated housing receptacle can be a filter element-associated resonator housing element and/or a filter housing-associated resonator housing element. In this way, the fluid can be diverted from a clean fluid side in the direction toward the raw fluid side without coming into contact with unfiltered fluid of the raw fluid side. In addition, a space-saving arrangement of the resonator housing can be realized. Furthermore, the resonator housing can be arranged flexibly in the filter housing. The filter bellows comprises an inflow side and an outflow side, wherein "penetrating cutout" means that the cutout extend from the inflow side all the way to the outflow side of the filter bellows. In other words, the penetrating cutout constitutes a through passage in the filter bellows.

A "filter bellows" is to be understood as a body of filter medium. The filter bellows can be provided, for example, as a bellows of a folded filter medium, i.e., a folded bellows. The term "filter bellows" is however not limited to this and encompasses also other filter medium bodies, for example, porous shaped bodies, honeycomb bodies or corrugated filter medium bodies, and so-called compact filters.

According to a beneficial embodiment of the filter system, at least one housing part of the filter housing can comprise a housing part-associated resonator housing receptacle into which a resonator housing element projects at least partially. The housing part-associated resonator housing receptacle can support or reinforce the corresponding resonator housing element, whereby the stability of the resonator housing can be improved. In addition, the housing part-associated resonator housing receptacle can guide the corresponding resonator housing element upon joining the resonator housing elements and/or upon installation of the filter element and/or upon joining the housing parts and thereby facilitate assembly of the filter system. In an embodiment, the filter element-associated resonator housing element can be guided and held in the housing part-associated resonator housing receptacle.

According to a beneficial embodiment of the filter system, at least one resonator housing element can enclose a cavity for both chambers, respectively. In this context, a plurality of such resonator housing elements can be connected to each other in longitudinal direction in order to form a long cavity. Alternatively, such a resonator housing element can be coupled to resonator housing elements which form the cavity for one chamber, respectively.

According to a beneficial embodiment of the filter system, at least two resonator housing elements can enclose a cavity for one of the two chambers, respectively, wherein the chambers of the two resonator housing elements are arranged adjacent to each other in an embodiment. In this context, the partition between the two chambers can be formed of walls of the respective resonator housing elements facing each other. In this context, it is possible that a chamber is formed of a plurality of resonator housing elements which are connected to each other.

According to a beneficial embodiment of the filter system, the at least one passage of the partition can be arranged in the region of the resonator inlet. For example, the partition can comprise the at least one passage in a region of the resonator housing which projects into the clean fluid region. As an alternative or in addition, the partition can comprise the at least one passage in a region of the resonator housing which projects into the region of the filter element and/or into the region of the raw fluid region.

According to a beneficial embodiment of the filter system, the filter element can comprise a circumferentially extending frame. The frame can surround a folded bellows and contribute to the stability of the filter element. In addition, the frame can be coupled to at least one housing part.

According to a beneficial embodiment of the filter system, the filter housing can be of a two-part configuration, wherein a bottom element comprises the auxiliary connection outlet. In this context, the bottom element can form a major portion of the walls surrounding the raw fluid region. Due to the two-part configuration, the insertion and removal of the filter element and cleaning of the filter housing can be facilitated.

According to a beneficial embodiment of the filter system, the bottom element in addition can comprise the main inlet. A cover element can comprise the main outlet. The filter element, in flow direction, can be arranged between the main inlet and the two outlets. In this context, a fluid flows from the main inlet through the raw fluid region and into a clean fluid region through a folded bellows of the filter element projecting into the raw fluid region. From there, the fluid can flow through the main outlet out of the filter housing. The fluid can also flow through the resonator inlet into the first chamber of the resonator structure and from there through the resonator outlet out of the housing. The purified fluid can be used, for example, in a further system which requires purified fluid, for example, air, for example, in a brake system for commercial vehicles or the like. Furthermore, an interaction of the fluid in the first chamber with the second chamber can reduce disturbing noises in the filter housing or disturbing noises at the auxiliary connection outlet.

Advantageously, the resonator structure comprises for noise damping a plurality of elements: at least two resonator housing elements which surround externally a cavity and a single-part or multi-part partition which divides the cavity into two chambers. These elements can be arranged at an arbitrary housing part or at the filter element. With such an arrangement, in an advantageous manner a so-called auxiliary connection resonator can be realized which comprises two volumes that are acoustically coupled through passages, for example, slots, in the partition element between the two volumes. Such a resonator can be realized within very limited installation space and can be produced inexpensively.

Sealing of the resonator structure and of the filter housing parts can be realized by a suitable seal material, for example, polyurethane (PUR), which, for example, is molded to a frame of the filter element or molded at filter housing parts. Alternatively, the seal element can also be a separate component which is tied in or fitted to the filter housing part and/or to the frame. In this way, the interior space of the filter housing can be sealed reliably upon intended assembly.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will expediently consider the features also individually and combine them to expedient further combinations.

DETAILED DESCRIPTION

Figure 1:
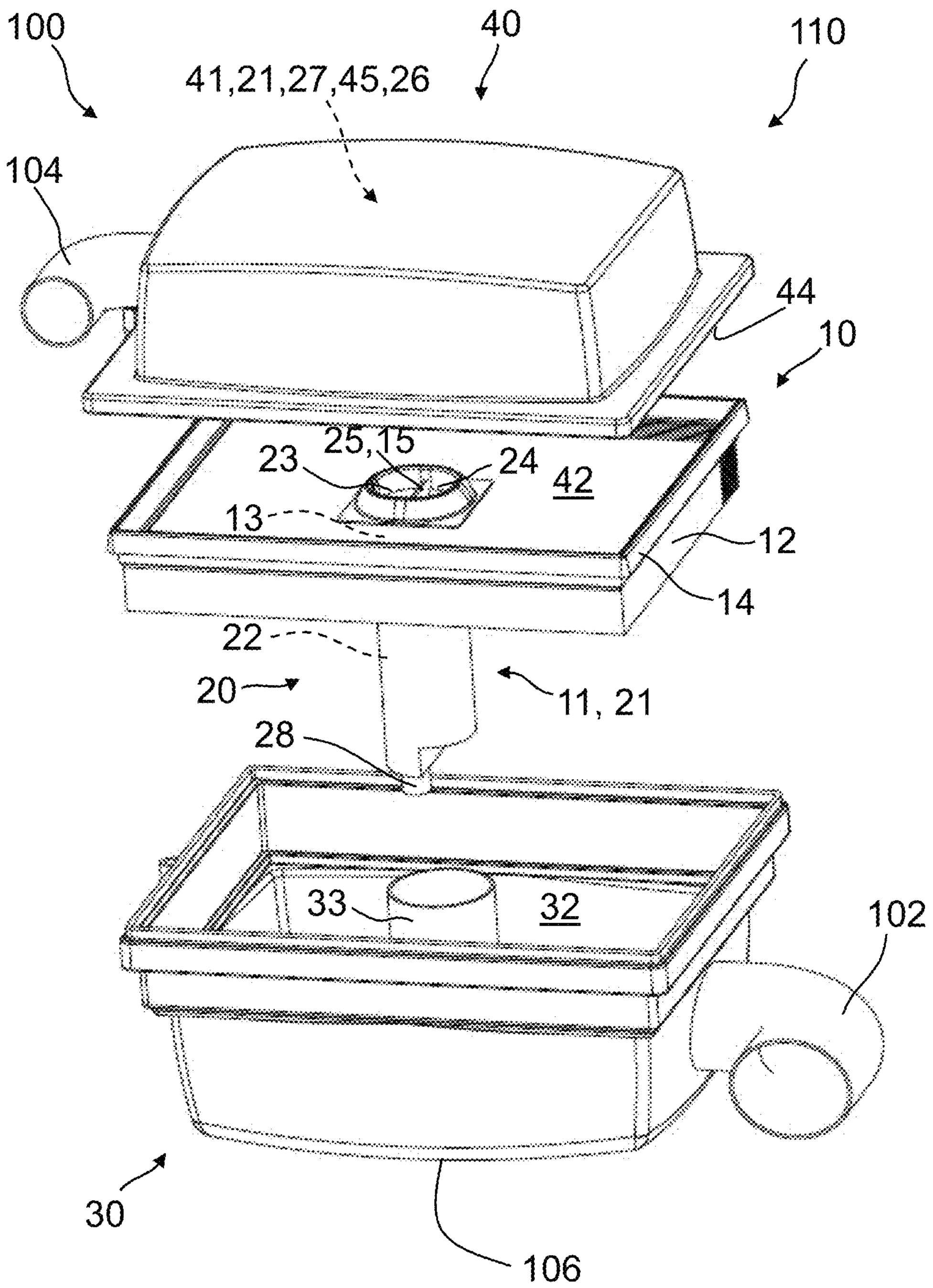
FIG. 1 shows an exploded view of a filter system according to a first embodiment of the invention with a filter element and two housing parts.

In the Figures, same or same-type components are identified with same reference characters. The Figures show only examples and are not to be understood as limiting.

Directional terminology used in the following with terms such as “left”, “right”, “top”, “bottom”, “in front of”, “behind”, “after”, and the like serve only for better understanding of the Figures and do not represent in any case a limitation of the generality. The illustrated components and elements, their configuration and use can vary in the context of considerations of a person of skill in the art and be adapted to the respective applications.

In the following, common features of the illustrated embodiments will be explained first in more detail. Subsequently, the embodiments will be explained individually.

As can be seen in FIGS. 1, 2, 6, 7, 11, 12, 16, 17, 21, 22, 26, 27, 31, 32, 36, 37, 41, and 42, the nine embodiments of the filter system 100 each comprise a filter housing 110 which encloses an interior space in which an exchangeable filter element 10 and a resonator structure 20 are arranged.

For example, the resonator structure 20 can be configured for noise damping of an auxiliary connection outlet 106.

As can be further seen in FIGS. 1, 2, 6, 7, 11, 12, 16, 17, 21, 22, 26, 27, 31, 32, 36, 37, 41, and 42, the filter housing 110 in the illustrated embodiments is of a two-part configuration and comprises two housing parts 30, 40. The filter housing 110 comprises in the illustrated embodiments a bottom element 30 and a cover element 40. In an embodiment, the bottom element 30 and the cover element 40 are connected to each other and enclose the interior space. The filter element 10 may be arranged between the bottom element 30 and the cover element 40 and divides the interior space into a raw fluid region 32 and a clean fluid region 42. In this way, four regions are formed in the interior space: the raw fluid region 32 which adjoins a region of the filter element 10 and a main inlet 102; the clean fluid region 42 which adjoins another region of the filter element 10 and a main outlet 104; the region which is spanned by the filter element 10; and a region in which the resonator structure 20 is arranged. The regions are enclosed by walls such that the fluid can flow only through the filter element 10 from the raw fluid region 32 into the clean fluid region 42. Furthermore, there is no possibility for the fluid to flow directly from the raw fluid region 32 into the resonator structure 20.

In an alternative embodiment, not illustrated, of the filter system 100, the filter housing 110 can also be of a single-part configuration. In addition, a filter housing 110 with more than two housing parts 30, 40 is conceivable. Furthermore, two side elements are also conceivable instead of a bottom element 30 and a cover element 40. Furthermore, the filter element 10 can be arranged in another suitable manner in the filter housing 110.

As can be further seen in FIGS. 1, 2, 6, 7, 11, 12, 16, 17, 21, 22, 26, 27, 31, 32, 36, 37, 41, and 42, the nine embodiments of the filter system 100 each comprise the resonator structure 20, wherein the resonator structure 20 comprises a multi-part resonator housing 21 which, in an embodiment, encloses a cavity 22 which is divided by a partition 25 into two chambers 23, 24. The end regions of the partition 25 contact at least one wall of the resonator housing 21, respectively. In this way, fluid can flow only through passages 26 of the partition 25 from a first chamber 23 into a second chamber 24 because it is prevented that fluid passes through a gap between partition 25 and corresponding wall of the resonator housing 21 from the first chamber 23 into the second chamber 24. In the illustrated embodiments, the resonator housing 21 is arranged perpendicularly to the filter element 10. In addition, the resonator housing 21 projects through the filter element 10. Furthermore, the resonator housing 21 projects with an end region into the clean fluid region 42 and projects with another end region into the raw fluid region 32. The cavity 22 which is enclosed by the resonator housing 21 is outwardly closed so that fluid can pass only through a resonator inlet 27 into the cavity 22 and can pass only through a resonator outlet 28 out of the cavity 22. In the illustrated embodiments, the first chamber 23 is embodied longer than the second chamber 24. In addition, the first chamber 23 in longitudinal direction is offset downwardly in relation to the second chamber 24. The cross section of the two chambers 23, 24 is substantially identical. The cross section and the length of the second chamber can be designed such that a sufficient volume for noise damping is available and can be adapted individually relative to the expected disturbing noises.

As can be further seen in FIGS. 3, 8, 13, 18, 24, 26, 29, 31, 39, 41, the partition 25 of the resonator structure 20 comprises at least one passage 26 through which the two chambers 23, 24 are acoustically coupled. In the illustrated embodiments of the filter system 100 according to the invention, the partition 25 comprises a plurality of passages 26. In an alternative embodiment, not illustrated, of the filter system 100, the partition 25 can also comprise only one passage 26. The passages 26 can have a shape and arrangement at the partition 25 adapted to the acoustic properties.

The passages 26 of the partition 25 are arranged in the region of the resonator inlet 27. With the exception of the fourth embodiment of the filter system (FIGS. 21 to 25), of the fifth embodiment of the filter system (FIGS. 26 to 30), and of the eighth embodiment of the filter system (FIGS. 36 to 40), the partition 25 comprises the passages 26 in a region of the resonator housing 21 which projects into the clean fluid region 42. In the fourth embodiment of the filter system (FIGS. 21 to 25), the partition 25 comprises the passages 26 in a region of the resonator housing 21 which projects into the region of the filter element 10. In the fifth embodiment of the filter system (FIGS. 26 to 30), the partition 25 comprises the passages 26 in a region of the resonator housing 21 which projects into the clean fluid region 42 and into the region of the filter element 10. In the eighth embodiment of the filter system (FIGS. 36 to 40), the partition 25 comprises the passages 26 in a region of the resonator housing 21 which projects into the clean fluid region 42 and into the region of the filter element 10. In an alternative embodiment, not illustrated, the partition 25 can comprise the passages 26 also in a region of the resonator housing 21 which projects into the raw fluid region 32 or into the raw fluid region 32 and into the region of the filter element 10 or into the raw fluid region, into the region of the filter element 10 and into the clean fluid region. In the illustrated embodiments, the passages 26 are embodied round or oval and are arranged in rows and columns at the partition 25. In an alternative embodiment, not illustrated, the passages 26 can also be configured as slots which extend in vertical direction or transverse direction at the partition 25. The partition 25 comprises in the illustrated embodiments a rectangular shape, wherein a width corresponds to the inner diameter of the resonator housing 21 and a length to the length of the resonator housing 21.

As can be further seen in FIGS. 1, 2, 5, 6, 7, 10, 11, 12, 15, 16, 17, 20, 21, 22, 25, 26, 27, 30, 31, 32, 35, 36, 37, 40, 41, 42, and 45, the bottom element 30 comprises an auxiliary connection outlet 106. In addition, the bottom element 30 comprises a main inlet 102.

As can be further seen in FIGS. 1, 2, 3, 6, 7, 8, 11, 12, 13, 16, 17, 18, 21, 22, 23, 26, 27, 28, 31, 32, 33, 36, 37, 38, 41, 42, and 43, the cover element 40 comprises a main outlet 104. The filter element 10 is arranged in flow direction between the main inlet 102 and the two outlets 104, 106.

As can be seen in FIGS. 1, 2, 6, 7, 11, 12, 16, 17, 21, 22, 26, 27, 31, 32, 36, 37, 41, and 42, the multi-part resonator housing 21 comprises the resonator inlet 27 and the resonator outlet 28 which are coupled to a first chamber 23. The resonator inlet 27 is arranged in the clean fluid region 42 of the interior space. The resonator inlet 27 can be seen clearly only in FIGS. 38 and 43. In this context, a cover element-associated resonator housing element 41 is connected to a ceiling of the cover element 40 and comprises at a wall enclosing the cavity 22 a cutout so that between the ceiling which covers the cavity 22 from above and the wall a gap is produced through which the fluid can flow out of the clean fluid region 42 into the first chamber 23. The resonator inlet 27 can be designed also in a different suitable manner; in addition, the resonator inlet 27 can also be arranged at a different suitable region of the multi-part resonator housing 21. Due to the arrangement of the resonator inlet 27 in the clean fluid region, the first chamber 23 is flowed through by filtered fluid. In this context, disturbing noises can be dampened or reduced due to an interaction with the fluid in a second chamber 24 via the passages 26.

As can be further seen in FIGS. 1, 2, 6, 7, 11, 12, 16, 17, 21, 22, 26, 27, 31, 32, 36, 37, 41, and 42, the resonator outlet 28 is coupled fluidically to the first chamber 23 and to the auxiliary connection outlet 106 of the filter housing 110. In this way, the first chamber 23 can act as a passageway between the clean fluid region 42 and the auxiliary connection outlet 106. The resonator outlet 28 comprises in the illustrated embodiments a round cross section; however, also other suitable shapes of the cross section are possible, such as angular or oval shapes of the cross section.

Due to the structure of the filter system 100, a fluid to be filtered flows through the main inlet 102 into the raw fluid region 32, flows through the filter element 10, and reaches as filtered fluid the clean fluid region 42. Via the main outlet 104 which adjoins the clean fluid region 42, the filtered fluid can be guided to a corresponding consumer. Furthermore, the filtered fluid can be diverted through the first chamber 23 of the resonator structure 20 and, inter alia, pass through the filter element 10 and the raw fluid region 32 and be guided through the auxiliary connection outlet 106 to a corresponding further consumer. The further consumer can be a compressor in a brake system of a truck. Upon passing through the first chamber 23, disturbing noises can be dampened due to the interaction with the second chamber 24.

As can be seen in FIGS. 1, 2, 6, 7, 11, 12, 16, 17, 21, 22, 26, 27, 31, 32, 36, 37, 41, and 42, the nine embodiments of the filter system 100 comprise each at least a housing part 30, 40 of the filter housing 110 which comprises a resonator housing element 31, 41. In addition, the filter element 10 comprises of resonator housing element 11, wherein the resonator housing elements 41, 31, 11 in an embodiment form the closed multi-part resonator housing 21. A resonator housing element 11 and/or partition element 15 connected to the filter element 10 is exchangeable together with the filter element 10. In the illustrated embodiments of the filter system 100 according to the invention, the cover elements 40 each comprise a cover element-associated resonator housing element 41 which is connected, in an embodiment of use, to the filter element-associated resonator housing element 11. With the exception of the first embodiment, all other embodiments illustrated in the FIGS. 6 to 45 of the filter system 100 comprise a bottom element-associated resonator housing element 31 which is connected, in an embodiment of use, to the filter element-associated resonator housing element 11. In this context, the two or the three resonator housing elements 11, 31, 41 are connected to each other such that the fluid can only reach the cavity 22 via the resonator inlet 27 and can flow out of the cavity 22 only via the resonator outlet 28. For example, a seal element can be arranged in connection regions between the resonator housing elements 11, 31, 41.

As can be further seen in FIGS. 1, 2, 6, 7, 11, 12, 16, 17, 21, 22, 26, 27, 31, 32, 36, 37, 41, and 42, the illustrated embodiments of the filter system 100 differ inter alia due to the configuration of the partitions 25. The partition 25, depending on the embodiment, can be of a single-part configuration (FIGS. 36 and 37) or of a multi-part configuration (FIGS. 1, 2, 6, 7, 11, 12, 16, 17, 21, 22, 26, 27, 31, 32, 41, and 42). In this context, as can be seen in FIGS. 11, 12, 14, 24, 26, 27, 31, 32, 36, 37, 39, 41, 42, at least one partition element 15, 35, 45 of the partition 25 can be connected to one of the resonator housing elements 11, 31, 41 and can project out from the corresponding resonator housing element 11, 31, 41 and, in an embodiment, project into at least one further resonator housing element 11, 31, 41. In case of the single-part or multi-part embodiment of the partition 25 with at least one partition element 15, 35, 45 projecting out from the corresponding resonator housing element 11, 31, 41, a resonator housing element 11, 31, 41 can be configured without partition element 15, 35, 45 or with a shorter partition element 15, 35, 45 and receive the other partition element 15, 35, 45 projecting out from the other resonator housing element 11, 31, 41 (FIGS. 11, 26, 27, 36, 37, 41, and 42). In this way, a plurality of partition elements 15, 35, 45 can be arranged in a resonator housing element 11, 31, 41 in case of a multi-part configuration of the partition 25. In addition or as an alternative, in case of a multi-part configuration of the partition 25, at least two resonator housing elements 11, 31, 41 each can be connected to a partition element 15, 35, 45 which form the partition 25 in an embodiment. In this context, a connection arrangement 29 connecting neighboring partition elements 15, 35, 45 can comprise connection elements which project out from at least one resonator housing element 11, 31, 41 in order to project into another resonator housing element 11, 31, 41 and to connect the corresponding partition elements 15, 35, 45 to each other (FIGS. 1, 2, 6, 7, 9, 10, 16, 17, 21, 22, 41 and 42). As an alternative, a partition element 15, 35, 45 which is connected to a resonator housing element 11, 31, 41 can project into another resonator housing element 11, 31, 41 and be connected to the partition element 15, 35, 45 connected to this resonator housing element 11, 31, 41 (FIGS. 22, 26, 27, 31, and 32). As can be seen further in FIGS. 11, 15, 26, 28, 30, 36, 38, 40, and 43, resonator housing elements 11, 31, 41 into which a partition element 15, 35, 45 projects comprise a partition element holder 36, 46. In the illustrated embodiments, the partition element holders 36, 46 are designed as a groove and extend at least at oppositely positioned side wall regions of the corresponding resonator housing element 31, 41. In an embodiment which is not illustrated, a seal element is arranged in the partition element holders 36, 46.

As can be seen further in FIGS. 1, 2, 4, 6, 7, 9, 11, 12, 14, 16, 17, 19, 21, 22, 24, 26, 27, 29, 31, 32, 34, 36, 37, 39, 41, and 42, the filter element 10 comprises in the illustrated embodiments a circumferentially extending frame 14. This frame 14 surrounds a folded bellows 12. In an embodiment, frame elements of the frame 14 are positioned respectively at a wall of at least one housing part 30, 40 of the filter housing 110. Alternatively, at least one housing part 30, 40 can comprise a bulge on which the frame 14 can rest. At the frame 14, a seal element can be arranged which seals the region between the frame elements and the respective wall or bulge so that no fluid from the raw fluid region 32 can reach the clean fluid region 42 without flowing through the folded bellows 12.

In illustrated embodiments, the folded bellows 12 is connected to the frame 14 at a bottom side of the frame 14.

Surfaces of the frame elements extend perpendicularly to the top side and to the bottom side of the folded bellows 12. Narrow sides of the frame elements extend parallel to the top side and to the bottom side of the folded bellows 12, respectively. In addition, the folded bellows 12 and the frame 14 comprise a rectangular cross section. Furthermore, the dimensions of the cross sections in the illustrated embodiments are designed such that the cross section of the folded bellows 12 is adapted to a cross section of the raw fluid region 32 of the filter housing 110. In the illustrated embodiments, the raw fluid region 32 is covered by the folded bellows 12 in this way in an embodiment of use.

In an alternative embodiment, not illustrated, the folded bellows 12 can comprise a different cross section. The cross section of the folded bellows can be circular, rectangular, triangular, polygonal, oval or the like and can be adapted beneficially to an existing installation space. In addition, the cross section can change along an axis. The folded bellows 12 can comprise a folded filter medium or wound layers of the filter medium. Also, a combination of folded and wound filter media is possible. The folded bellows 12 projects in an embodiment of use into a raw fluid region 32 of the filter housing 110.

As can be seen further in FIGS. 1, 2, 4, 6, 7, 9, 11, 12, 14, 16, 17, 19, 21, 22, 24, 26, 27, 29, 31, 32, 34, 36, 37, 39, 41, and 42, the folded bellows 12 of the filter element 10 comprises a cutout which forms a filter element-associated resonator housing receptacle 13 in which a resonator housing element 11, 31, 41 is arranged in an embodiment. The cutout of the filter bellows 12 extends from an inflow side of the filter bellows 12 all the way to an outflow side of the filter bellows 12 so that the filter bellows 12 is completely penetrated by the cutout. In this context, the filter element-associated resonator housing element 11 may be arranged in the filter element-associated resonator housing receptacle 13. In further embodiments, the bottom element-associated resonator housing element 31 in addition also projects into the filter element-associated resonator housing receptacle 13. In an alternative embodiment, not illustrated, a cover element-associated resonator housing element 41 can also project, in addition or as an alternative, into the filter element-associated resonator housing receptacle 13.

As can be seen further in FIGS. 1, 2, 5, 6, 7, 10, in a further embodiment at least one housing part 30, 40 of the filter housing 110 can comprise a resonator housing receptacle 33 into which a resonator housing element 41, 31, 11 projects as least partially. In the embodiments illustrated in FIGS. 1, 2, 5, 6, 7, 10, the bottom element 30 comprises the resonator housing receptacle 33 and receives the filter element-associated resonator housing element 11. In an alternative embodiment, not illustrated, the cover element 40 can also comprise a resonator housing receptacle 33 and can receive a filter element-associated resonator housing element 11 in this way.

As can be seen further in FIGS. 1-5, 8, 11-15, 16-20, 21-25, 26-30, 31-35, 36-40, 41-45, at least one resonator housing element 41, 31, 11 encloses a cavity for both chambers 23, 24, respectively.

As can be seen further in FIGS. 6, 7, 9, and 10, in the illustrated second embodiment of the filter arrangement 100 at least two resonator housing elements 41, 11 each can enclose a cavity for one of the two chambers 23, 24 or a section for one of the two chambers 23, 24. The chambers 23, 24 of the two resonator housing elements 41, 11 are arranged adjacent to each other in an embodiment. A wall which is facing the other resonator housing element 41, 11 forms a section of the partition 25.

As can be further seen in FIGS. 2, 3, 7, 8, 12, 13, 17, 18, 22, 23, 27, 28, 32, 33, 37, 38, 42, and 43, the illustrated cover elements 40 each comprise at an end region facing the bottom element 30 a receiving region 44. The receiving region 44 is configured as a flute or a groove and is arranged, extending circumferentially, at the cover element 40. The receiving region 44 is arranged so as to be positioned opposite the frame 14 of the filter element 10. In an embodiment of use, the receiving region 44 receives the frame 14 of the filter element 10 and a circumferentially extending rim of the bottom element 30. The housing parts 30, 40 can comprise in addition connection elements in order to be connected to each other in an embodiment of use.

In the following, the individual embodiments illustrated in the Figures will be explained in more detail.

Figure 2:
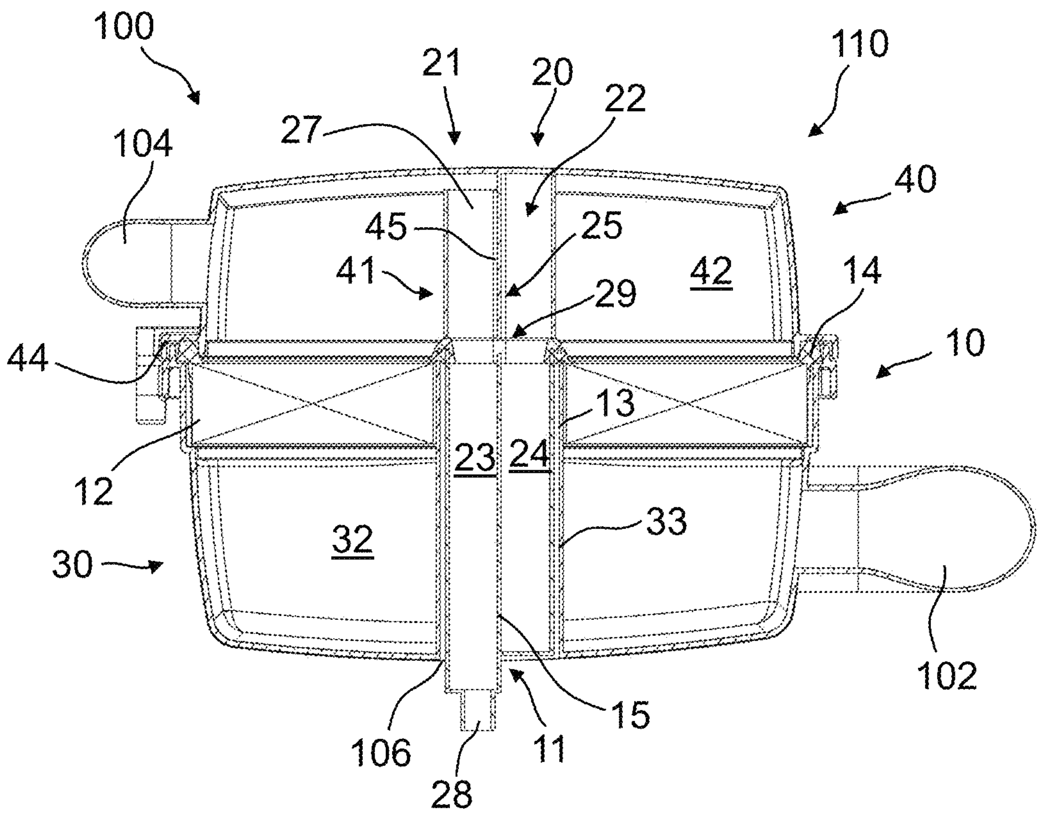
FIG. 2 shows a section illustration of the filter system of FIG. 1.
Figure 3:
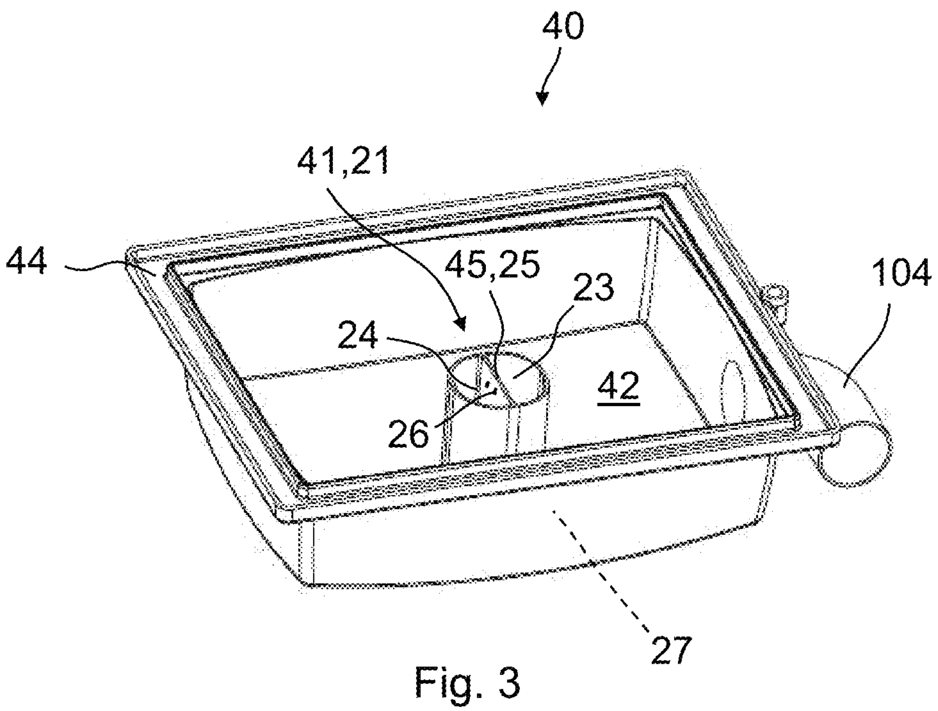
FIG. 3 shows an isometric view from below of a cover element of the filter system of FIGS. 1 and 2.
Figure 4:
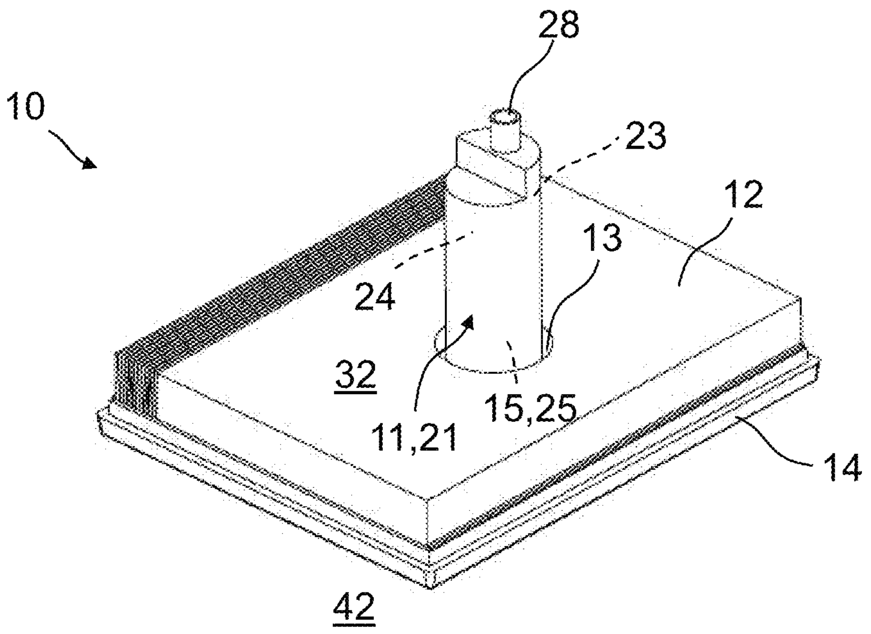
FIG. 4 shows an isometric view from below of a filter element of the filter system of FIGS. 1 and 2.
Figure 5:
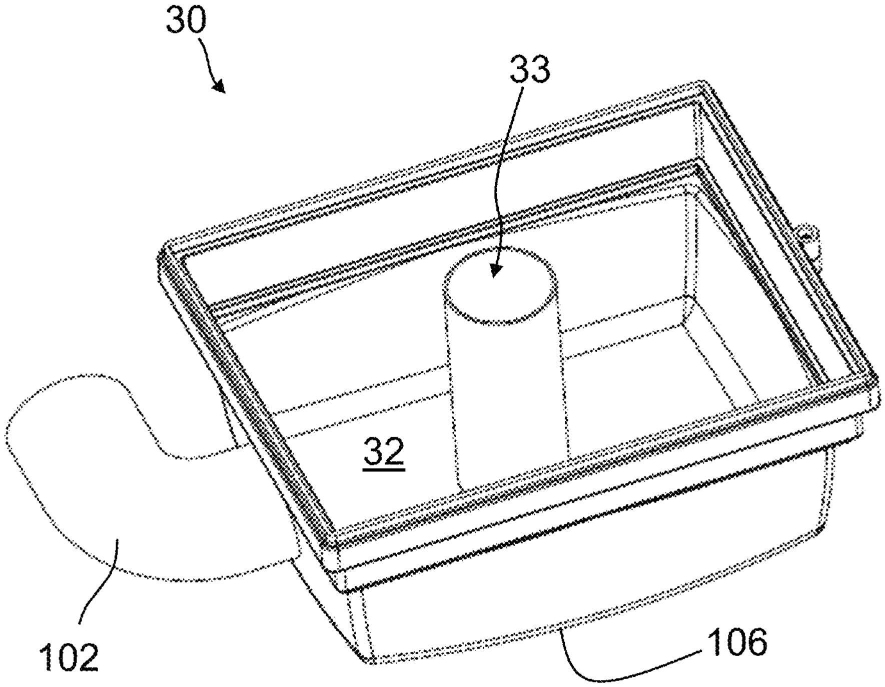
FIG. 5 shows an isometric view from above of a bottom element of the filter system of FIGS. 1 and 2.

FIGS. 1 through 5 show a filter system 100 according to a first embodiment of the invention. Here, FIG. 1 shows an exploded view of the filter system 100 with a filter element 10 and two housing parts 30, 40. FIG. 2 shows a section illustration of the filter system 100. FIG. 3 shows an isometric view from below of a cover element 40 of the filter system 100. FIG. 4 shows an isometric view from below of a filter element 10 of the filter system 100. FIG. 5 shows an isometric view from above of the bottom element 30 of the filter system 100.

As can be seen in FIGS. 1 to 3, the cover element 40 comprises a cylinder-shaped, downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is connected fixedly to the cover element-associated resonator housing element 41.

As can be seen further in FIG. 3, the cover element-associated partition element 45 comprises two passages 26 at an end region which is facing the filter element 10. The passages 26 have dimensions which are adapted to at least one predetermined frequency of the resonator structure 20. Other shapes and numbers of the passages 26 are also possible.

As can be seen in FIGS. 1, 2, and 4, the filter element comprises a cylinder-shaped, upwardly open filter element-associated resonator housing element 11. The length of the filter element-associated resonator housing element 11 corresponds approximately to a height between a bottom of the bottom element 30 and a bottom side of the folded bellows plus the thickness of the folded bellows 12. The folded bellows 12 comprises a filter element-associated resonator housing receptacle 13 in which a section of the filter element-associated resonator housing element 11 is arranged.

The open end regions of the filter element-associated resonator housing element 11 and of the cover element-associated resonator housing element 41 are adapted relative to each other such that the resonator housing elements 11, 41 form a seal-tight resonator housing 21. The end region of the filter element-associated resonator housing 11 facing the bottom element 30 comprises the resonator outlet 28. The filter element-associated resonator housing element 11 comprises a filter element-associated partition element 15. The filter element-associated resonator housing element 11 can be connected fixedly or detachably to the filter element 10. The filter element-associated partition element 15 can be connected fixedly or detachably to the filter element-associated resonator housing element 11.

As can be further seen in FIGS. 1, 2, and 5, the bottom element 30 comprises a bottom element-associated resonator housing receptacle 33. In the region of the bottom element-associated resonator housing receptacle 33, the bottom of the bottom element 30 comprises the auxiliary connection outlet 106.

As can be seen further in FIG. 2, a section of the filter element-associated resonator housing element 11 is arranged in the bottom element-associated resonator housing receptacle 33. The resonator outlet 28 projects through the auxiliary connection outlet 106.

As can be further seen in FIG. 2, the filter element-associated resonator housing element 11 comprises connection elements of a connection arrangement 29 which connects the partition elements 15, 45 and the resonator housing elements 11, 41 to each other. In the illustrated embodiment, the partition 25 is formed by the filter element-associated partition element 15 and the cover element-associated partition element 45.

Figure 6:
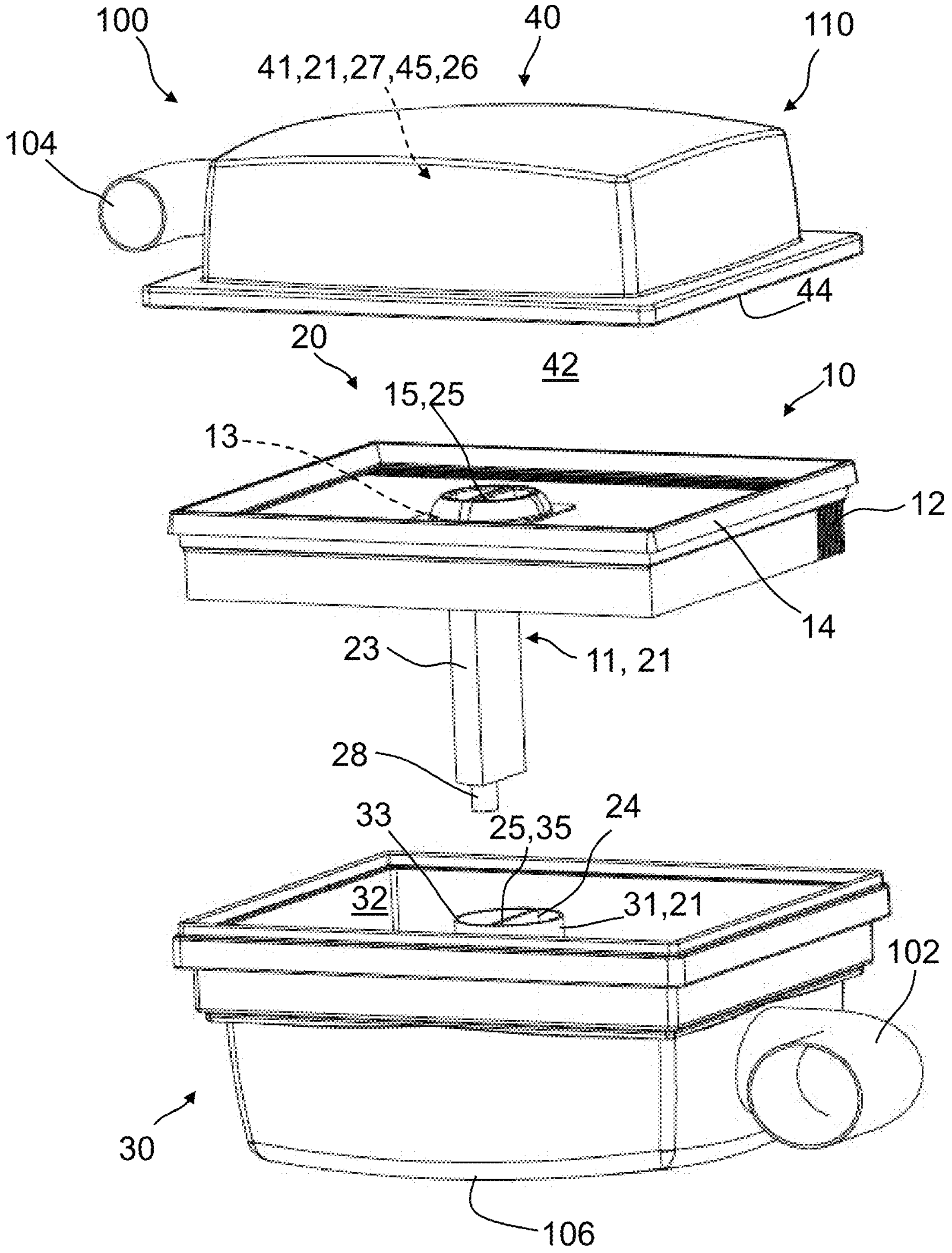
FIG. 6 shows an exploded view of a filter system according to a second embodiment of the invention with a filter element and two housing parts.
Figure 7:
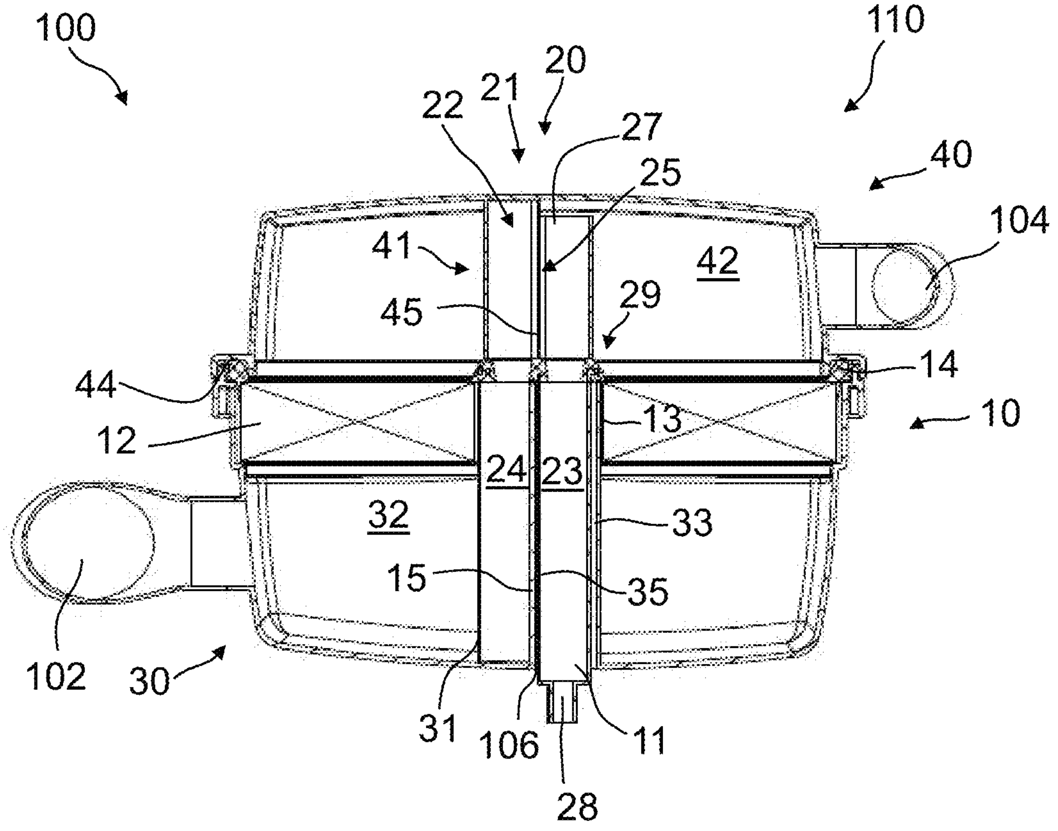
FIG. 7 shows a section illustration of the filter system of FIG. 6.
Figure 8:
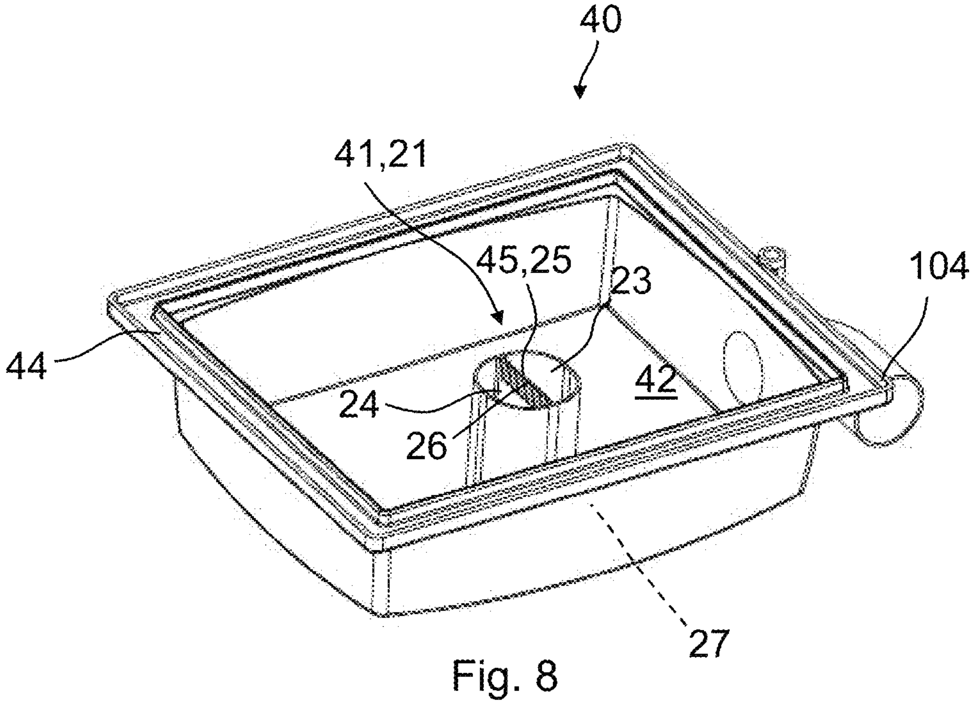
FIG. 8 shows an isometric view from below of a cover element of the filter system of FIGS. 6 and 7.
Figure 9:
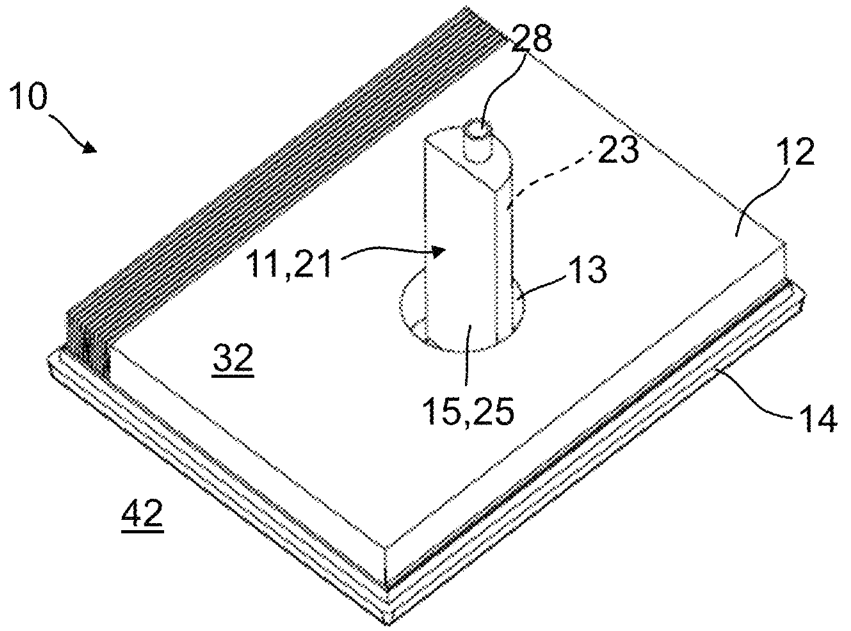
FIG. 9 shows an isometric view from below of a filter element of the filter system of FIGS. 6 and 7.
Figure 10:
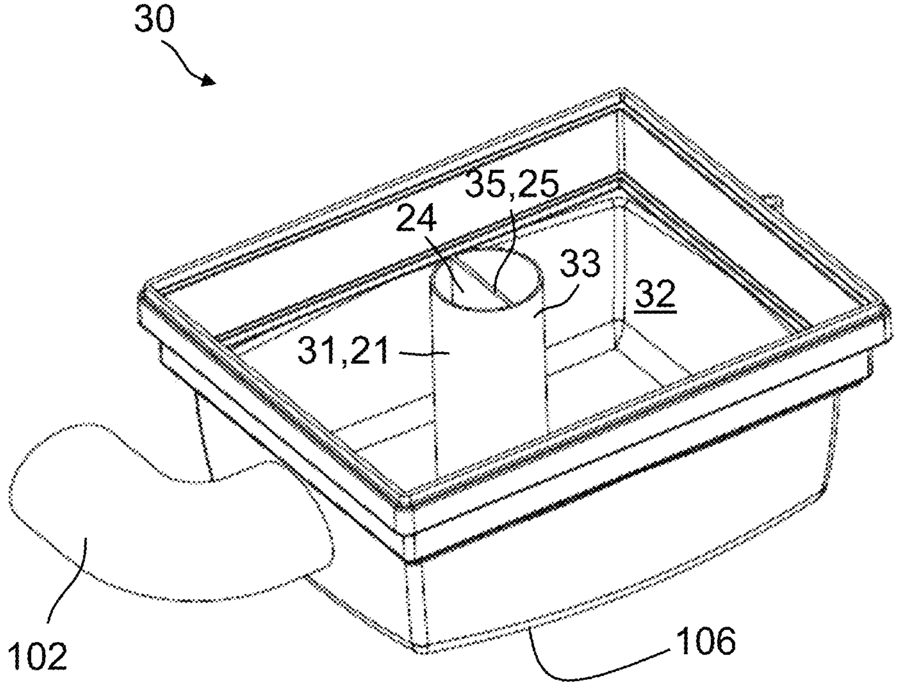
FIG. 10 shows an isometric view from above of a bottom element of the filter system of FIGS. 6 and 7.

FIGS. 6 to 10 show a filter system 100 according to a second embodiment of the invention. Here, FIG. 6 shows an exploded view of the filter system 100 with a filter element 10 and two housing parts 30, 40. FIG. 7 shows a section illustration of the filter system 100. FIG. 8 shows an isometric view from below of a cover element 40 of the filter system 100. FIG. 9 shows an isometric view from below of a filter element 10 of the filter system 100. FIG. 10 shows an isometric view from above of a bottom element 30 of the filter system 100.

As can be seen in FIGS. 6 to 8, the cover element 40 comprises a cylinder-shaped, downwardly open cover element-associated resonator housing element 41. The cover element-associated resonator housing element 41 comprises a cover element-associated partition element 45 and the resonator inlet 27 which cannot be seen. The cover element-associated resonator housing element 41 is fixedly connected to the cover element 40. The cover element-associated partition element 45 is fixedly connected to the cover element-associated resonator housing element 41.

As can be further seen in FIG. 8, the cover element-associated partition element 45 comprises at an end region facing the filter element 10 a grid-type structure which forms the passages 26. The passages 26 comprise dimensions which are adapted to at least one predetermined frequency of the resonator structure 20. Other shapes and numbers of passages 26 are also possible.

As can be seen in FIGS. 6, 7, and 9, the filter element comprises an upwardly open filter element-associated resonator housing 11. The end region facing the cover element 40 and a section of the filter element-associated resonator housing element 11 extending through the filter bellows 12 comprise a round cross section. A section of the filter element-associated resonator housing element 11 extending in the raw fluid region 32 comprises a semicircular cross section. In this context, the filter element-associated partition element 15 which divides the round cross section into two semi-circular cross sections passes into an outer wall of the section with the semi-circular cross section. The section with the semi-circular cross section comprises only the first chamber 23.

The length of the filter element-associated resonator housing element 11 corresponds approximately to a height between a bottom of the bottom element 30 and a bottom side of the folded bellows 12 plus the thickness of the folded bellows 12. The folded bellows 12 comprises a filter element-associated resonator housing receptacle 13 in which the section of the filter element-associated resonator housing element 11 with round cross section and two chambers 23, 24 is arranged.

The open end regions of the filter element-associated resonator housing element 11 and of the cover element-associated resonator housing element 41 are adapted relative to each other such that the resonator housing elements 11, 41 form a seal-tight resonator housing 21. The end region of the filter element-associated resonator housing element 11 facing the bottom element 30 comprises the resonator outlet 28.

As can be further seen in FIGS. 6, 7, and 10, the bottom element 30 comprises a bottom element-associated resonator housing receptacle 33 and a bottom element-associated resonator housing element 31. In the region of the bottom element-associated resonator housing receptacle 33, the bottom of the bottom element 30 comprises the auxiliary connection outlet 106. The region of the filter element-associated resonator housing element 11 which forms the first chamber 23 projects into the bottom element-associated resonator housing receptacle 33. The resonator outlet 28 projects through the auxiliary connection outlet 106. Adjacent to the bottom element-associated resonator housing receptacle 33, the bottom element-associated resonator housing element 31 is arranged so that the second chamber 24 is arranged adjacent to the first chamber 23. An end region of the bottom element-associated resonator housing element 31 facing the filter element 10 is connected to the filter element-associated resonator housing element 11.

As can be further seen in FIG. 7, the filter element-associated resonator housing element 11 comprises connection elements of the connection arrangement 29 which connects the partition elements 15, 45 and the resonator housing elements 11, 31, 41 to each other. The partition 25 in the illustrated embodiment is formed by the cover element-associated partition element 45, the filter element-associated partition element 15, and a wall of the bottom element-associated resonator housing receptacle 33.

Figure 11:
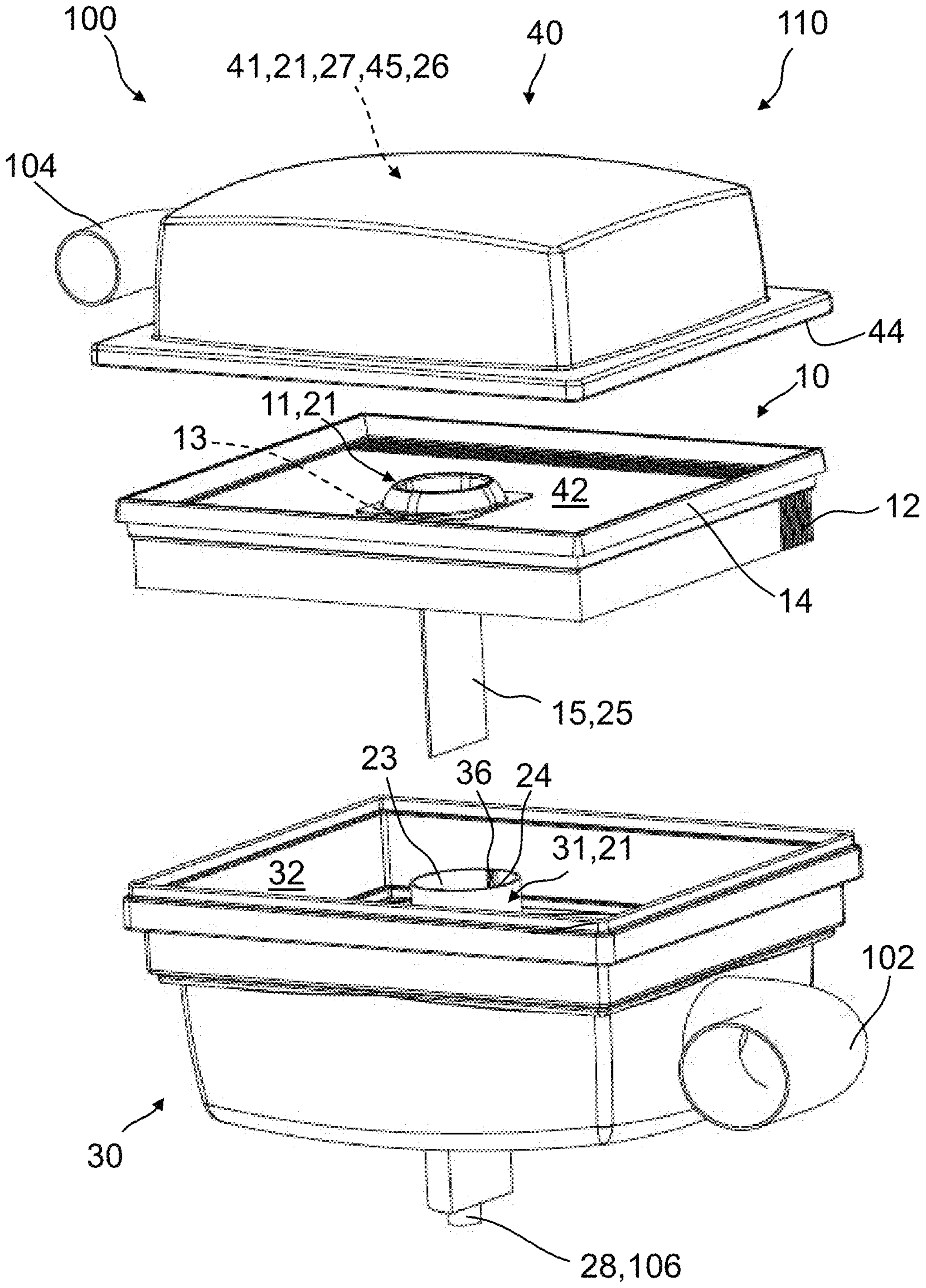
FIG. 11 shows an exploded view of a filter system according to a third embodiment of the invention with a filter element and two housing parts.
Figure 12:
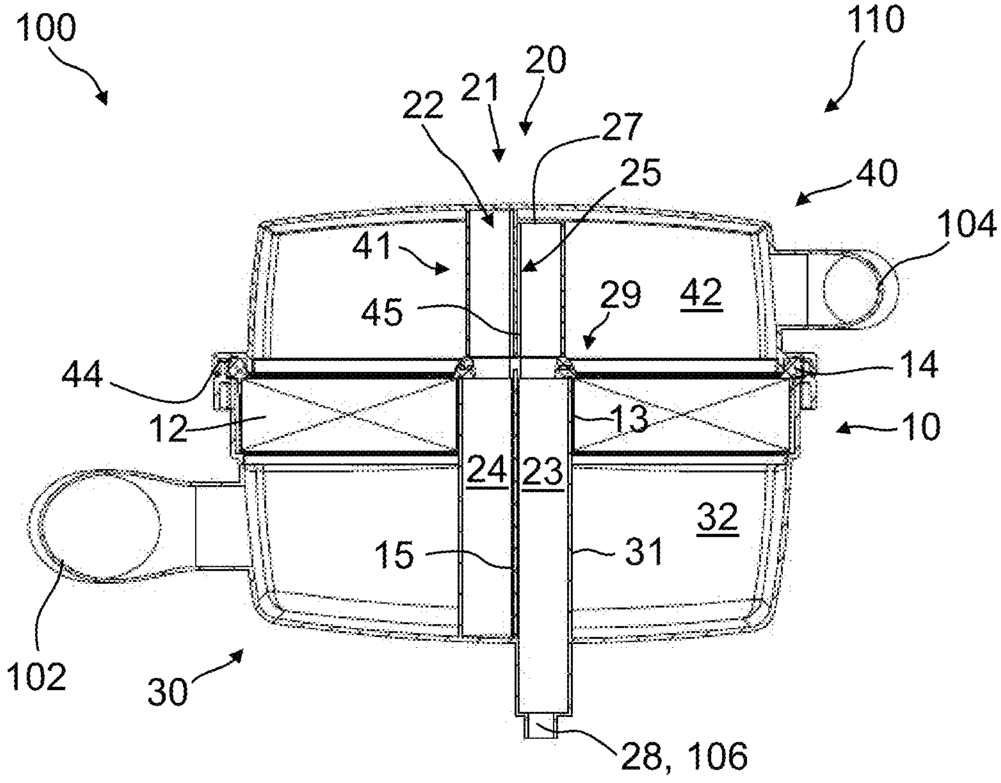
FIG. 12 shows a section illustration of the filter system of FIG. 11.
Figure 13:
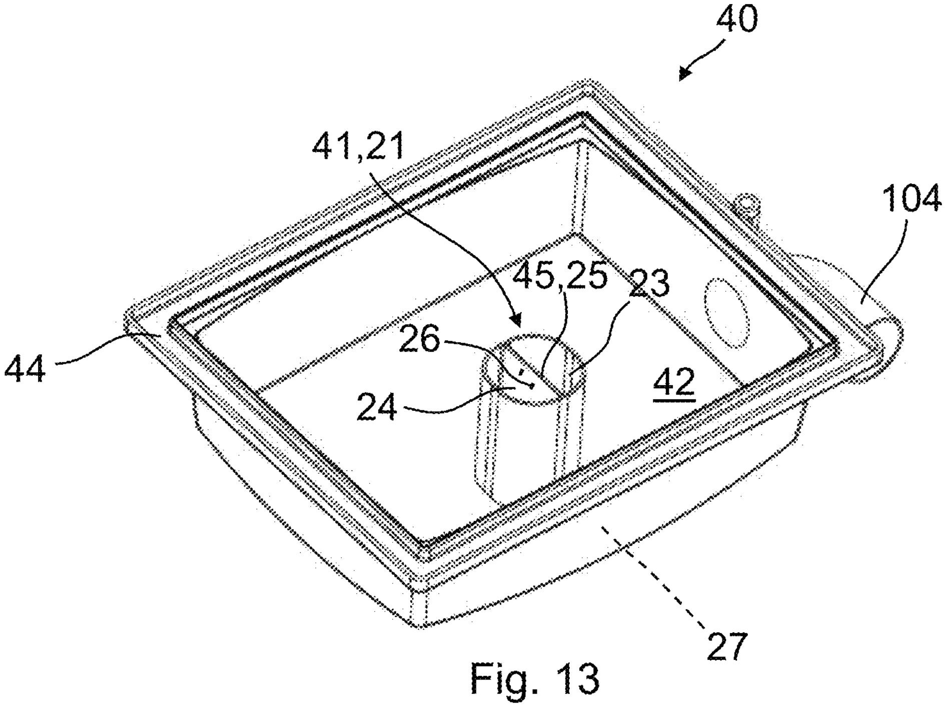
FIG. 13 shows an isometric view from below of a cover element of the filter system of FIGS. 11 and 12.
Figure 14:
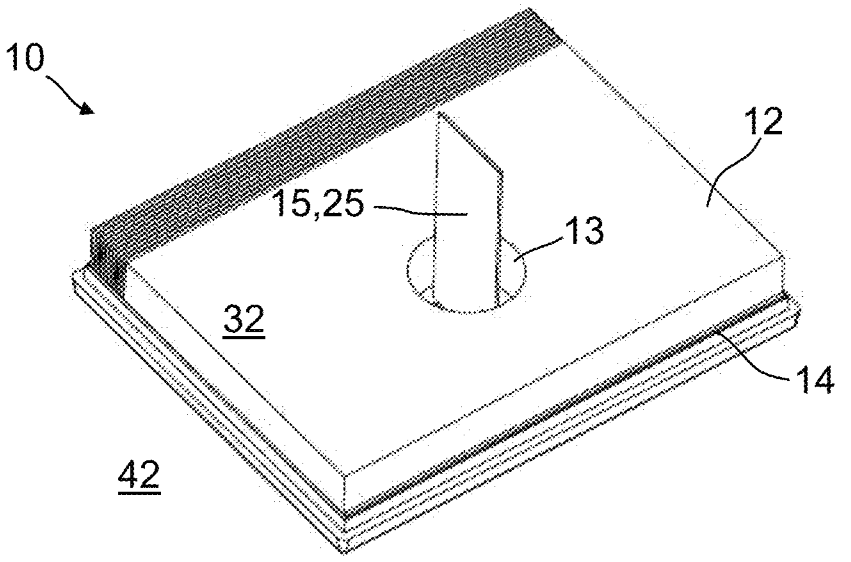
FIG. 14 shows an isometric view from below of a filter element of the filter system of FIGS. 11 and 12.
Figure 15:
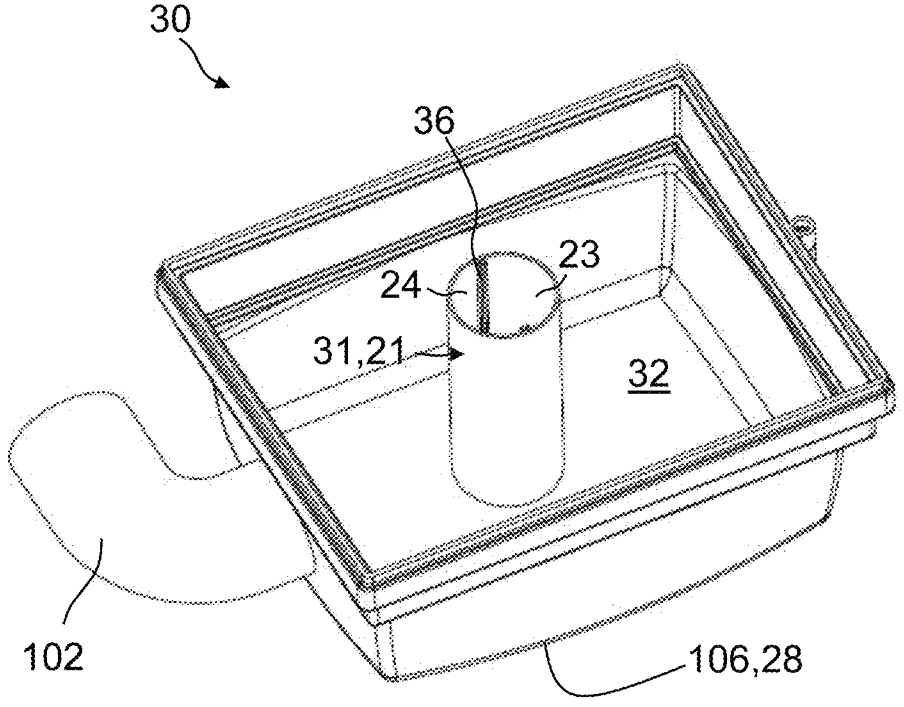
FIG. 15 shows an isometric view from above of a bottom element of the filter system of FIGS. 11 and 12.

FIGS. 11 to 15 show a filter system 100 according to a third embodiment of the invention. Here, FIG. 11 shows an exploded view of the filter system 100 with a filter element 10 and two housing parts 30, 40. FIG. 12 shows a section illustration of the filter system 100. FIG. 13 shows an isometric view from below of a cover element 40 of the filter system 100. FIG. 14 shows an isometric view from below of a filter element 10 of the filter system 100. FIG. 15 shows an isometric view from above of a bottom element 30 of the filter system 100.

As can be seen in FIGS. 11 to 13, the cover element 40 comprises a cylinder-shaped, downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is connected fixedly to the cover element-associated resonator housing element 41.

As can be further seen in FIG. 13, the cover element-associated partition element 45 comprises two passages 26 at an end region facing the filter element 10. The passages 26 comprise dimensions which are adapted to at least one predetermined frequency of the resonator structure 20. Other shapes and numbers of the passages 26 are possible also.

As can be seen in FIGS. 11, 12, and 14, the filter element 10 comprises an upwardly and downwardly open cylinder-shaped filter element-associated resonator housing element 11. The filter element-associated resonator housing 11 comprises a minimal height and does not project out from the filter element-associated resonator housing receptacle 13.

The open end regions of the filter element-associated resonator housing element 11 and of the cover element-associated resonator housing element 41 which are facing each other are adapted relative to each other such that the resonator housing elements 11, 41 form a seal-tight resonator housing section.

As can be seen further in FIGS. 11, 12, and 15, the bottom element 30 comprises a cylinder-shaped bottom element-associated resonator housing element 31. The bottom element-associated resonator housing element 31 comprises an opening which forms the auxiliary connection outlet 106 and the resonator outlet 28.

An end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 11, 12, 14, the filter element-associated resonator housing element 11 comprises a partition element 15 which projects into the bottom element-associated resonator housing element 31. The bottom element-associated resonator housing element 31 comprises a bottom element-associated partition holder 36. In this way, the filter element-associated partition element 15 and the cover element-associated partition element 45 form the partition 25. The bottom element-associated resonator housing element 31 projects with a section into the filter element-associated resonator housing receptacle 13.

As can be further seen in FIG. 12, the filter element-associated resonator housing element 11 comprises connection elements of a connection arrangement 29 which connects the partition elements 15, 45 and the resonator housing elements 11, 31, 41 to each other.

Figure 16:
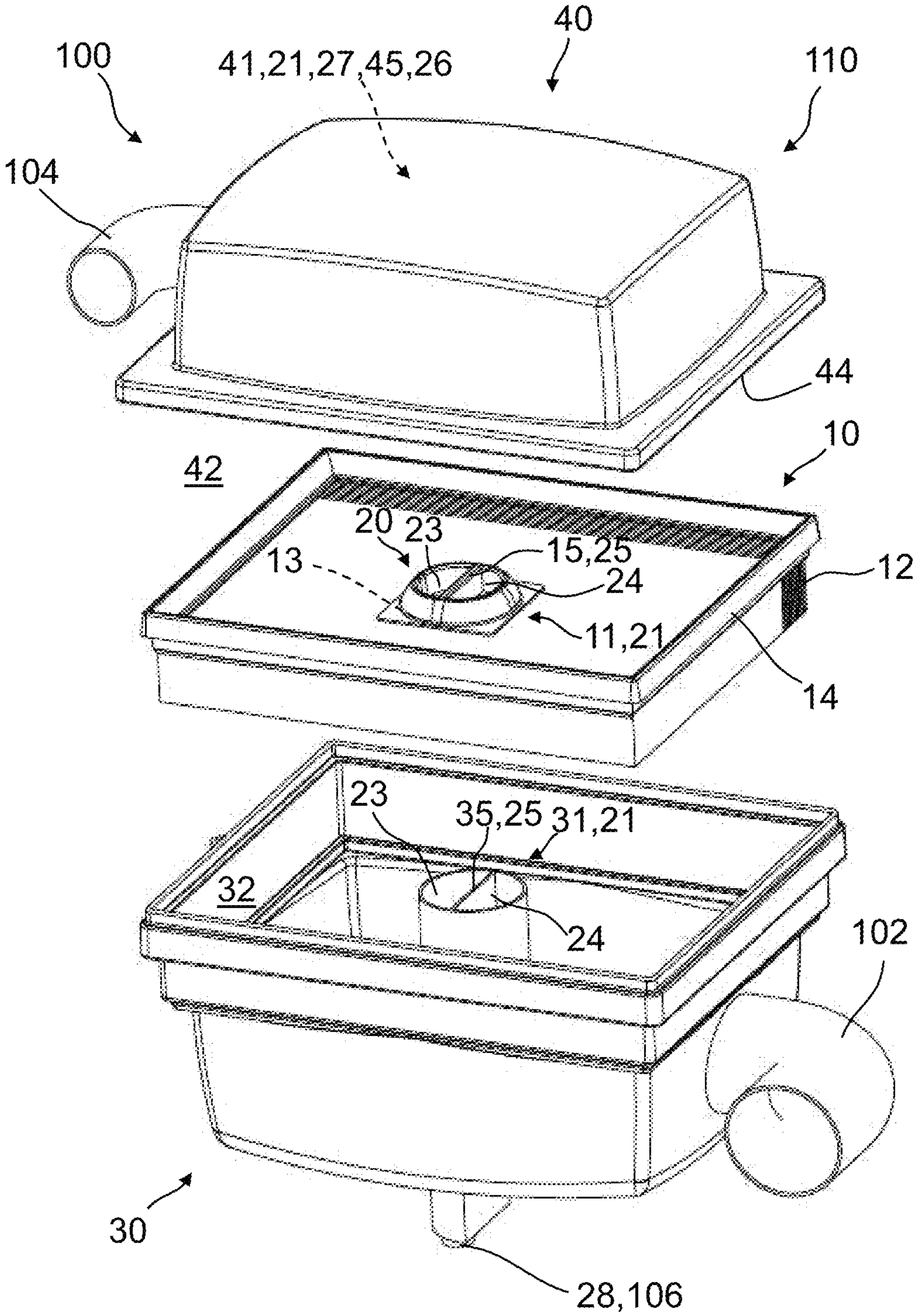
FIG. 16 shows an exploded view of a filter system according to a fourth embodiment of the invention with a filter element and two housing parts.
Figure 17:
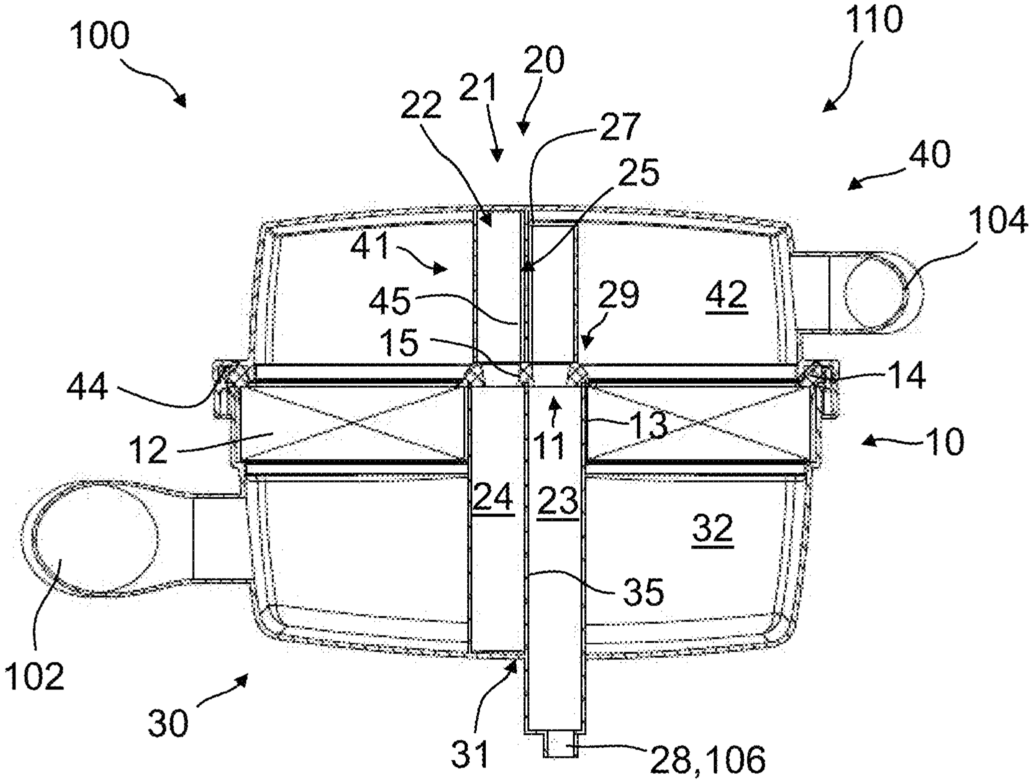
FIG. 17 shows a section illustration of the filter system of FIG. 16.
Figure 18:
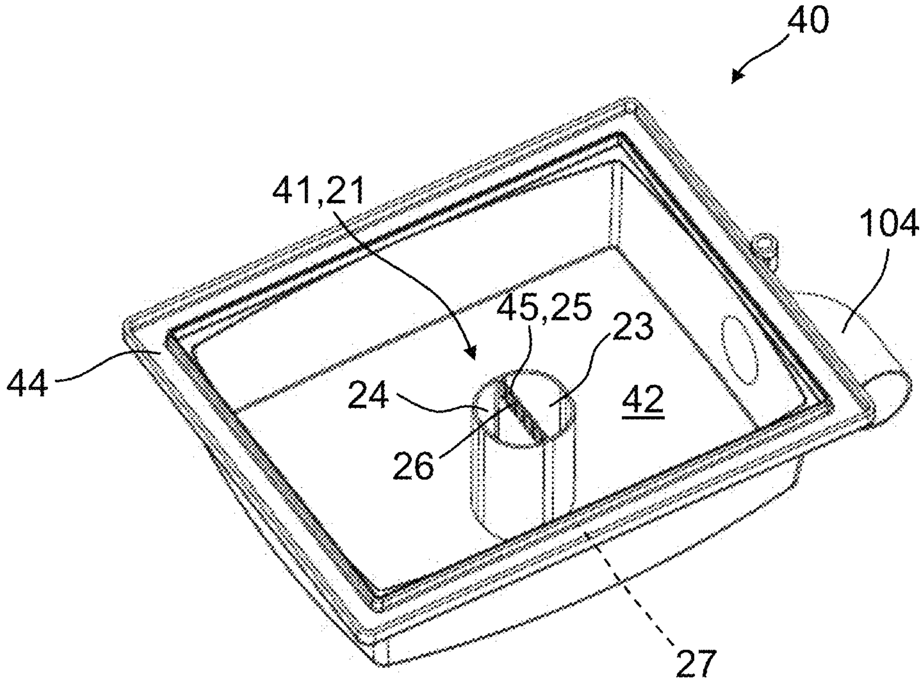
FIG. 18 shows an isometric view from below of a cover element of the filter system of FIGS. 16 and 17.
Figure 19:
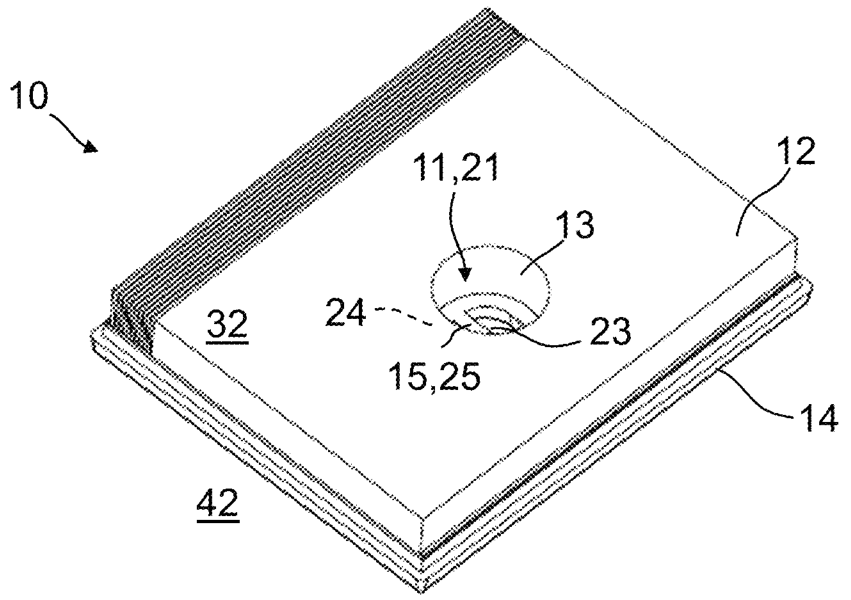
FIG. 19 shows an isometric view from below of a filter element of the filter system of FIGS. 16 and 17.
Figure 20:
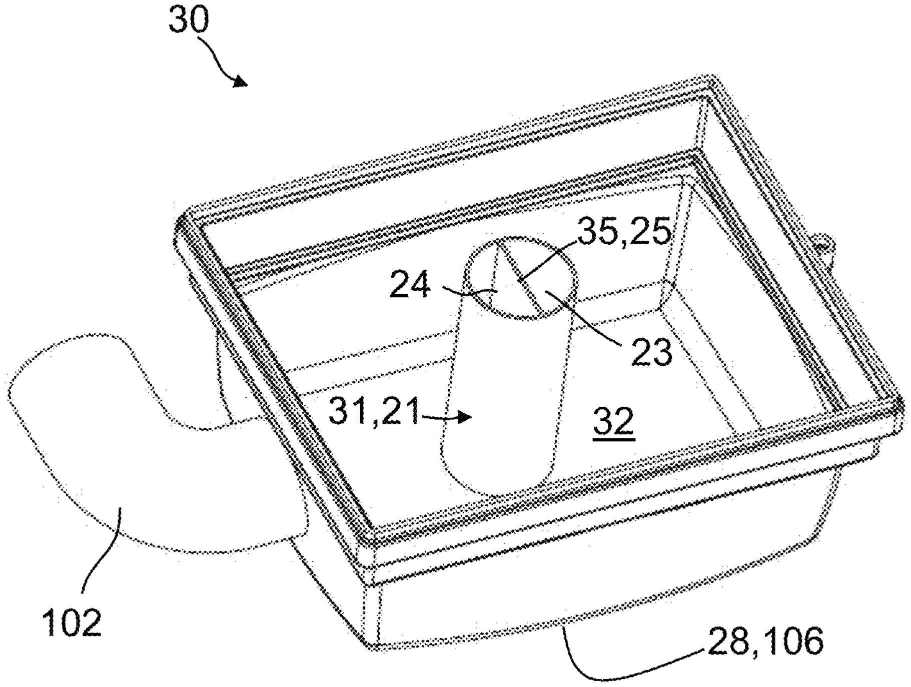
FIG. 20 shows an isometric view from above of a bottom element of the filter system of FIGS. 16 and 17.

FIGS. 16 to 20 show a filter system 100 according to a fourth embodiment of the invention. Here, FIG. 16 shows an exploded view of the filter system 100 with a filter element 10 and two housing parts 30, 40. FIG. 17 shows a section illustration of the filter system 100. FIG. 18 shows an isometric view from below of a cover element 40 of the filter system 100. FIG. 19 shows an isometric view from below of a filter element 10 of the filter system 100. FIG. 20 shows an isometric view from above of a bottom element 30 of the filter system 100.

As can be seen in FIG. 16 to 18, the cover element 40 comprises a cylinder-shaped downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is connected fixedly to the cover element-associated resonator housing element 41.

As can be further seen in FIG. 18, the cover element-associated partition element 45 comprises in an end region facing the filter element 10 a grid-type structure which forms the passages 26. The passages 26 comprise dimensions which are adapted to the at least one predetermined frequency of the resonator structure 20. Other shapes and numbers of the passages 26 are possible also.

As can be seen in FIGS. 16, 17, and 19, the filter element 10 comprises an upwardly and downwardly open cylinder-shaped filter element-associated resonator housing element 11. The filter element-associated resonator housing element 11 comprises a minimal height and does not project out from the filter element-associated resonator housing receptacle 13.

The open end regions of the filter element-associated resonator housing element 11 and of the cover element-associated resonator housing element 41 which are facing each other are adapted relative to each other such that the resonator housing elements 11, 41 form a seal-tight resonator housing section.

As can be further seen in FIGS. 16, 17, and 20, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element 35. The bottom element-associated partition element 35 is connected fixedly to the bottom element-associated resonator housing element 31.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 16, 17, 19, bottom element-associated resonator housing element 31 projects with a section into the filter element-associated resonator housing receptacle 13.

As can be further seen in FIG. 17, the filter element-associated resonator housing element 11 comprises connection elements of a connection arrangement 29 which connect the partition elements 15, 35, 45 and the resonator housing elements 11, 31, 41 to each other. The partition 25 is formed by the filter element-associated partition element 15, the cover element-associated partition element 45, and the bottom element-associated partition element 35.

Figure 21:
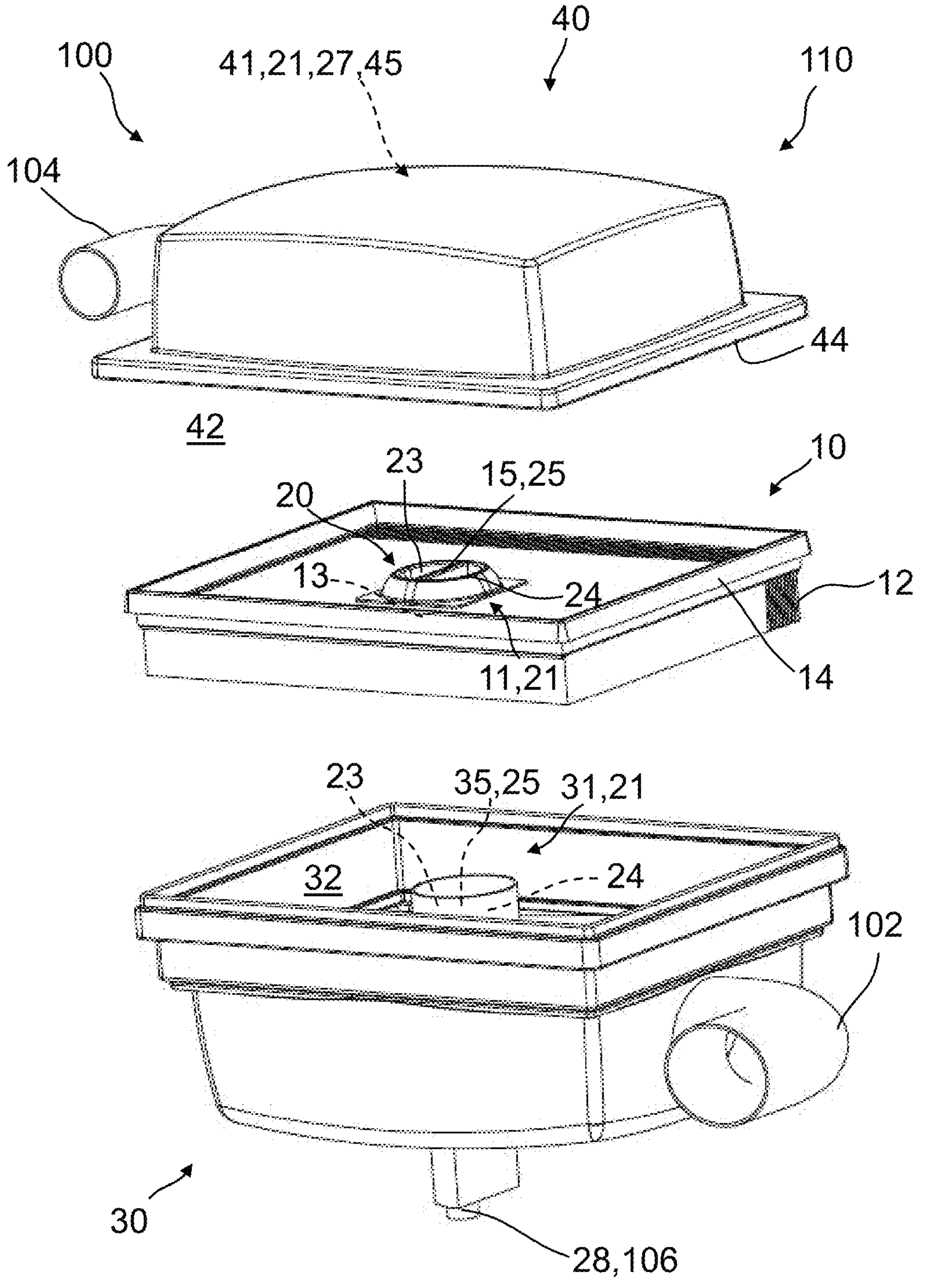
FIG. 21 shows an exploded view of a filter system according to a fifth embodiment of the invention with a filter element and two housing parts.
Figure 22:
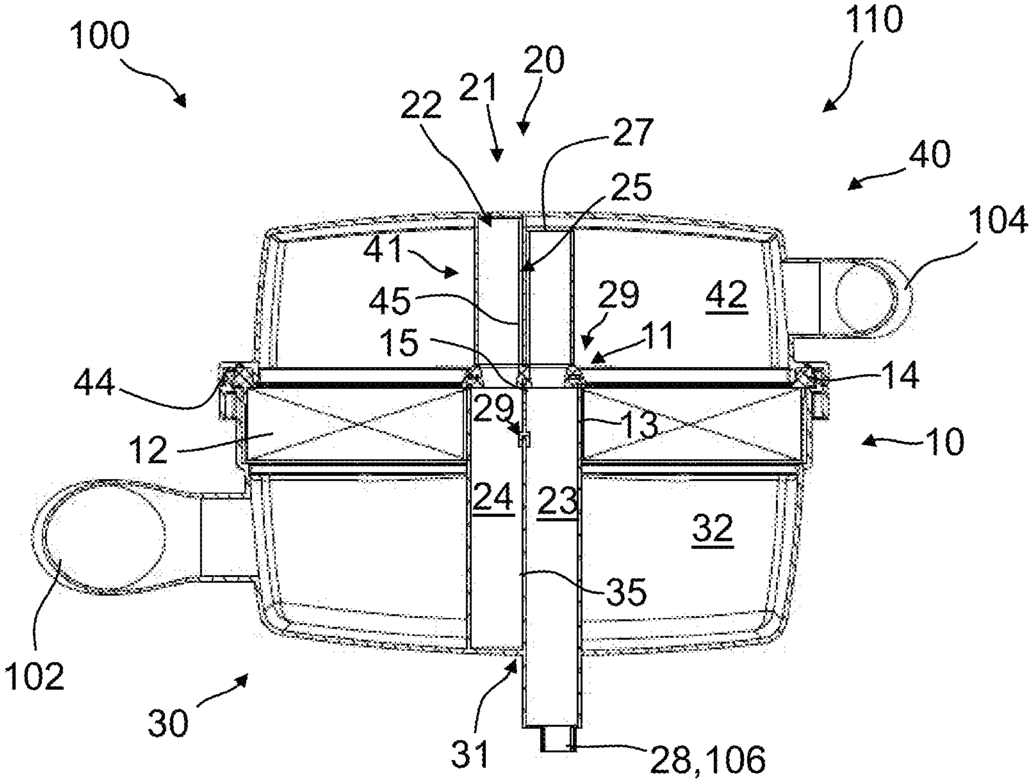
FIG. 22 shows a section illustration of the filter system of FIG. 21.
Figure 23:
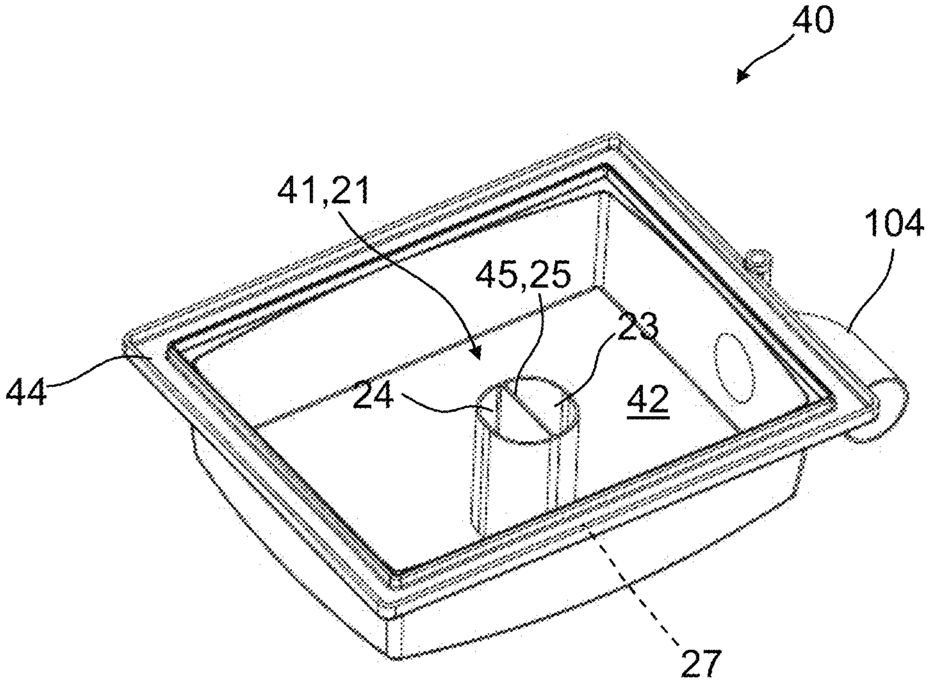
FIG. 23 shows an isometric view from below of a cover element of the filter system of FIGS. 21 and 22.
Figure 24:
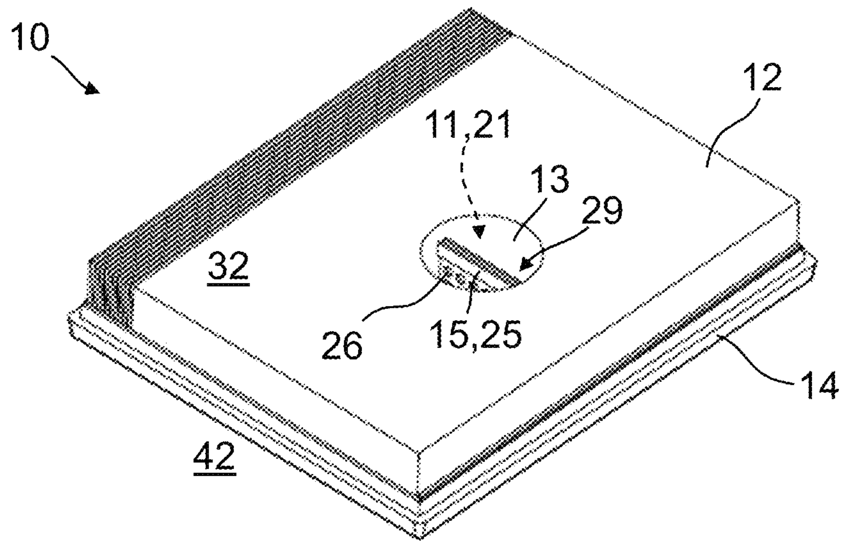
FIG. 24 shows an isometric view from below of a filter element of the filter system of FIGS. 21 and 22.
Figure 25:
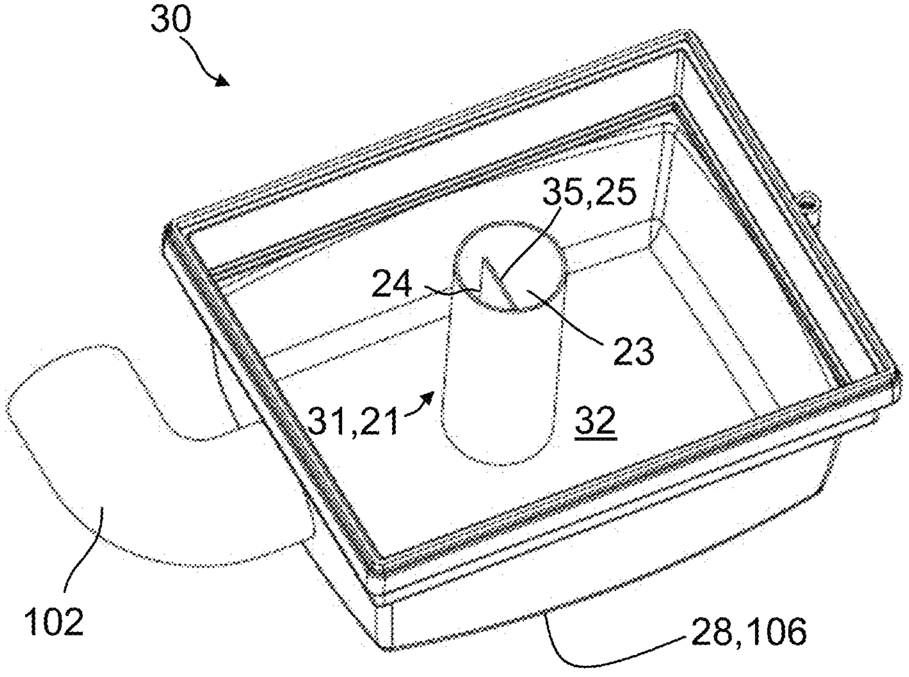
FIG. 25 shows an isometric view from above of a bottom element of the filter system of FIGS. 21 and 22.

FIGS. 21 to 25 show a filter system 100 according to a fifth embodiment of the invention. Here, FIG. 21 shows an exploded view of the filter system 100 with a filter element 10 and two housing parts 30, 40. FIG. 22 shows a section illustration of the filter system 100. FIG. 23 shows an isometric view from below of a cover element 40 of the filter system 100. FIG. 24 shows an isometric view from below of a filter element 10 of the filter system 100. FIG. 25 shows an isometric view from above of a bottom element 30 of the filter system 100.

As can be seen in FIGS. 21 to 23, the cover element 40 comprises a cylinder-shaped, downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is connected fixedly to the cover element-associated resonator housing element 41.

As can be seen in FIG. 23, the cover element-associated partition element 45 has no passages 26.

As can be seen in FIGS. 21, 22, and 24, the filter element 10 comprises an upwardly and downwardly open cylinder-shaped filter element-associated resonator housing element 11. The filter element-associated resonator housing element 11 comprises a minimal height and does not project out from the filter element-associated resonator housing receptacle 13. The filter element-associated resonator housing element 11 comprises a filter element-associated partition element 15 which comprises at an end region facing the bottom element a grid structure which forms the passages 26. The passages 26 have dimensions which are adapted to the at least one predetermined frequency of the resonator structure 20. Other shapes and numbers of the passages 26 are possible also.

The open end regions of the filter element-associated resonator housing element 11 and of the cover element-associated resonator housing element 41 which are facing each other are adapted relative to each other such that the resonator housing elements 11, 41 form a seal-tight resonator housing section. In addition, the end regions of the partition elements 15, 45 facing each other are adapted relative to each other.

As can be further seen in FIGS. 21, 22, and 25, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element 35. The bottom element-associated resonator housing element 31 comprises a section into which a section of the filter element-associated partition element 15 projects. In this context, two partition elements 15, 35 which are connected to each other are arranged in the bottom element-associated resonator housing element 31. The bottom element-associated partition element 35 is connected fixedly to the bottom element-associated resonator housing element 31.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 21, 22, 25, the bottom element-associated resonator housing element 31 projects with a section into the filter element-associated resonator housing receptacle 13.

As can be further seen in FIG. 22, the filter element-associated resonator housing element 11 and the end regions of the filter element-associated partition element 15 and of the bottom element-associated partition element 35 comprise connection elements of a connection arrangement 29 which connects the partition elements 15, 35, 45 and the resonator housing elements 11, 31, 41 to each other. The partition 25 is formed by the filter element-associated partition element 15, the cover element-associated partition element 45, and the bottom element-associated partition element 35.

Figure 26:
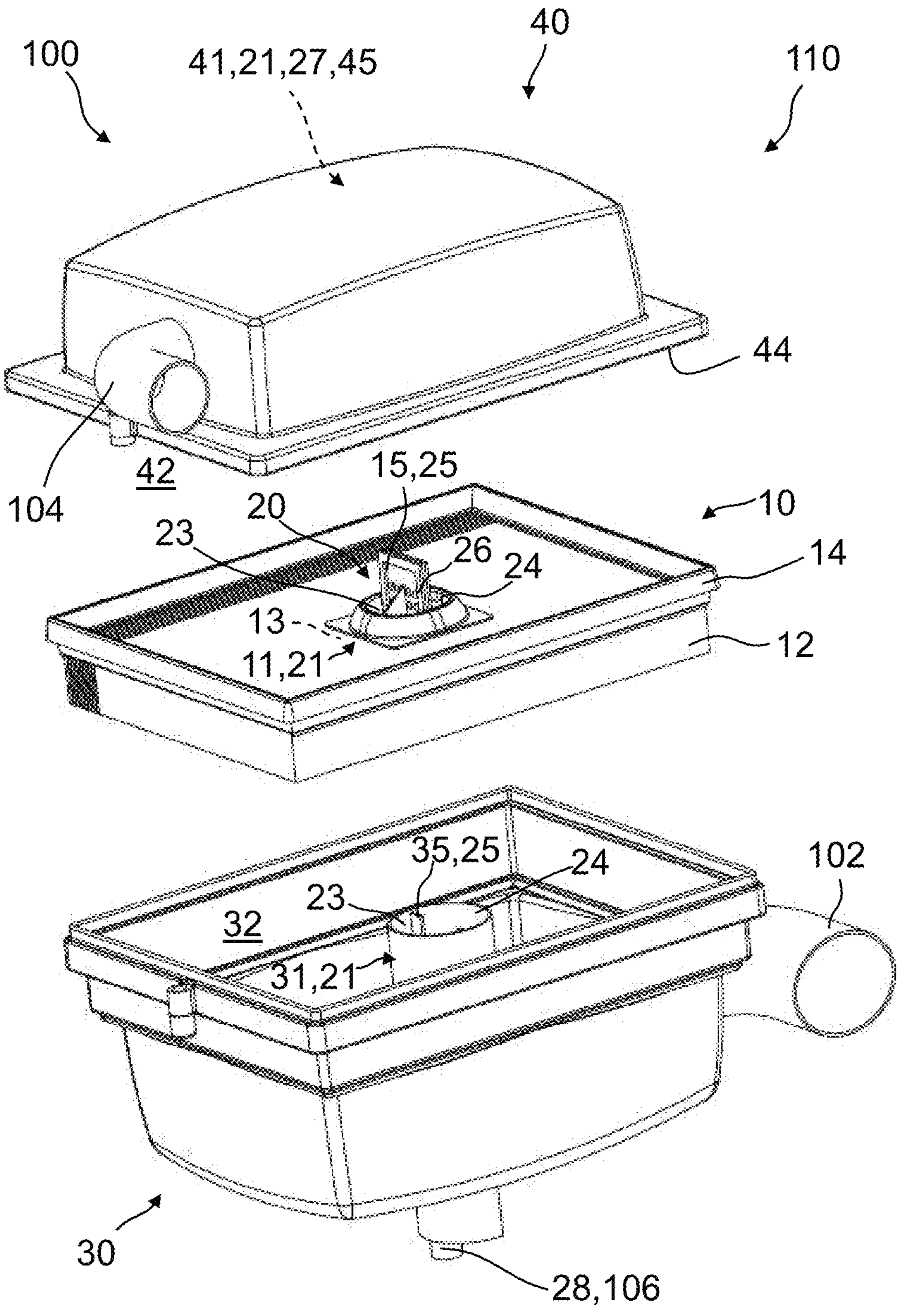
FIG. 26 shows an exploded view of a filter system according to a sixth embodiment of the invention with a filter element and two housing parts.
Figure 27:
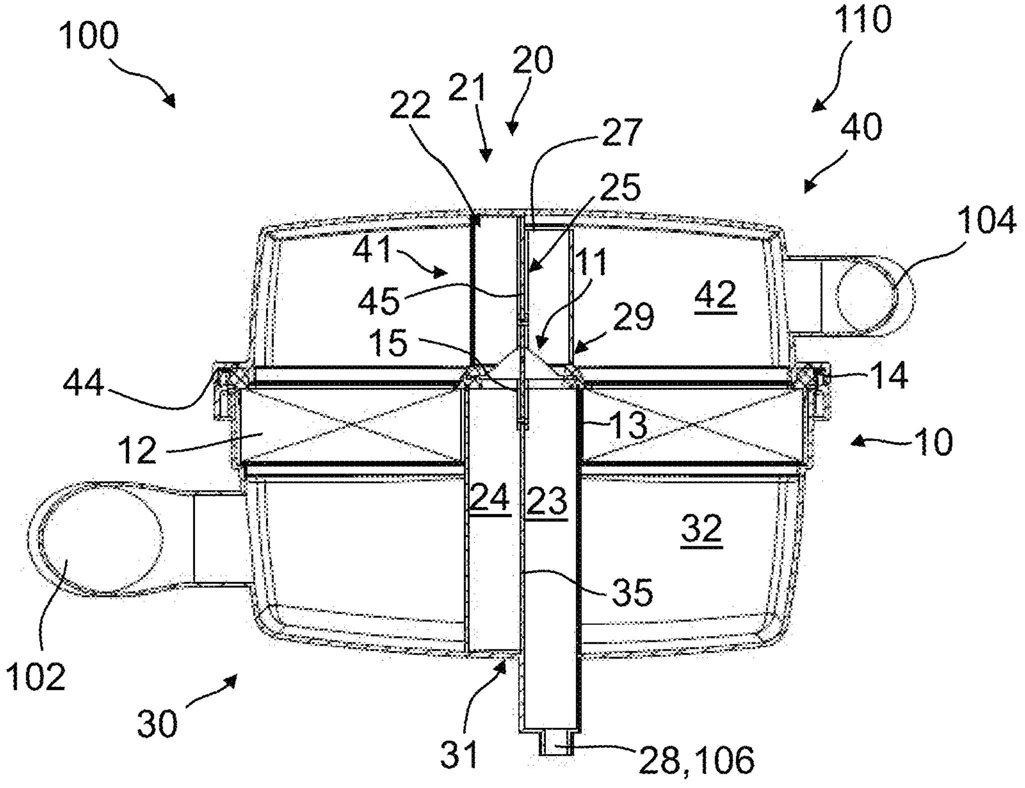
FIG. 27 shows a section illustration of the filter system of FIG. 26.
Figure 28:
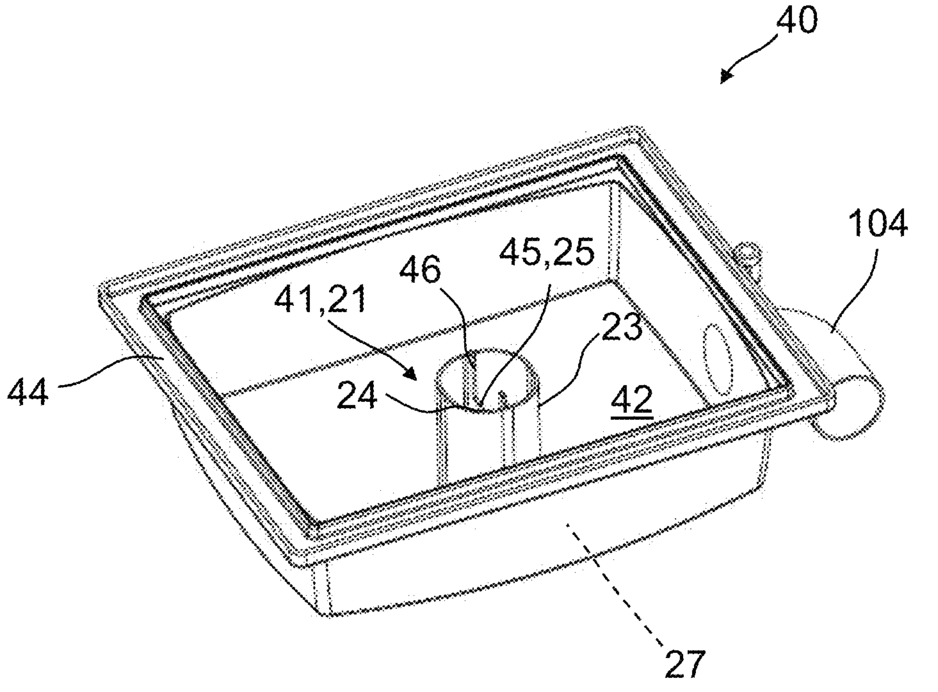
FIG. 28 shows an isometric view from below of a cover element of the filter system of FIGS. 26 and 27.
Figure 29:
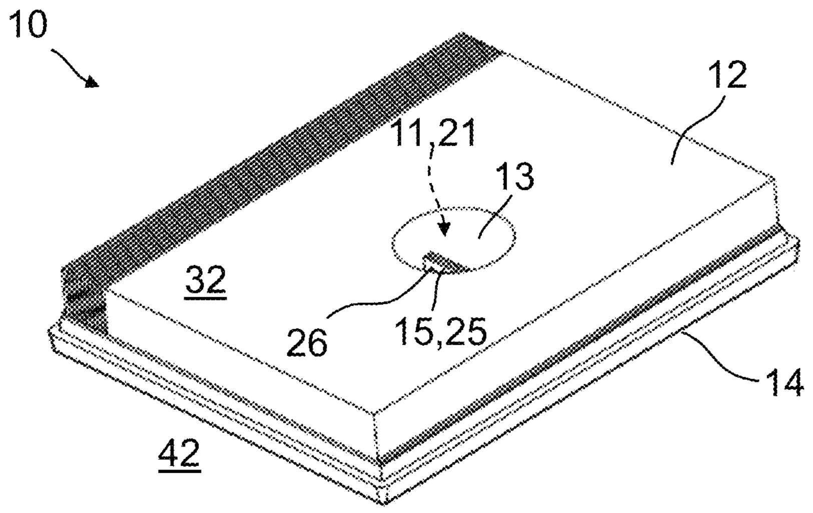
FIG. 29 shows an isometric view from below of a filter element of the filter system of FIGS. 26 and 27.
Figure 30:
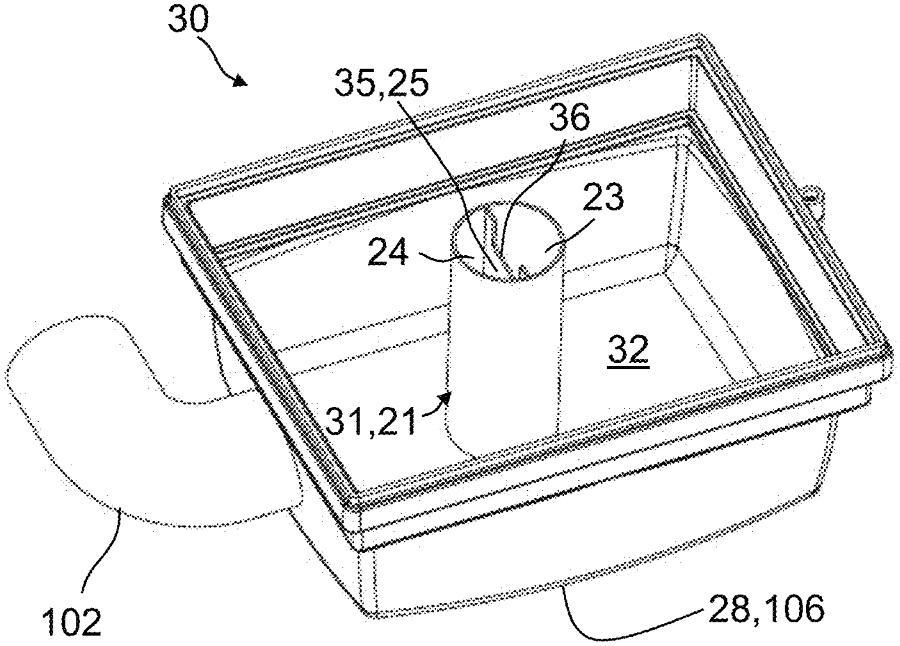
FIG. 30 shows an isometric view from above of a bottom element of the filter system of FIGS. 26 and 27.

FIGS. 26 to 30 show a filter system 100 according to a sixth embodiment of the invention. Here, FIG. 26 shows an exploded view of the filter system 100 with a filter element 10 and two housing parts 30, 40. FIG. 27 shows a section illustration of the filter system 100. FIG. 28 shows an isometric view from below of a cover element 40 of the filter system 100. FIG. 29 shows an isometric view from below of a filter element 10 of the filter system 100. FIG. 30 shows an isometric view from above of a bottom element 30 of the filter system 100.

As can be seen in FIGS. 26 to 28, the cover element 40 comprises a cylinder-shaped downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is connected fixedly to the cover element-associated resonator housing element 41. The cover element-associated partition element 45 is shorter than the cover element-associated resonator housing element 41 so that a further separation element can be arranged in the cover element-associated resonator housing element 41.

As can be further seen in FIG. 28, the cover element-associated partition element 45 has no passages 26. The cover element-associated partition element 45 comprises a cover element-associated partition element holder 46.

As can be seen in FIGS. 26, 27, and 29, the filter element 10 comprises an upwardly and downwardly open cylinder-shaped filter element-associated resonator housing element 11. The filter element-associated resonator housing element 11 comprises a minimal height and does not project out from the filter element-associated resonator housing receptacle 13. The filter element-associated resonator housing element 11 comprises a filter element-associated partition element 15 which projects at both sides out from the filter element-associated resonator housing element 11. In this context, a section facing the cover element 40 and a section facing the bottom element 30 have a grid-type structure which forms the passages 26. The passages 26 have dimensions which are adapted to at least one predetermined frequency of the resonator structure 20. Other shapes and numbers of the passages 26 are possible also.

The open end regions of the filter element-associated resonator housing element 11 and of the cover element-associated resonator housing element 41 which are facing each other are adapted relative to each other such that the resonator housing elements 11, 41 form a seal-tight resonator housing section. Furthermore, the cover element-associated partition element holder 46 and the section of the filter element-associated partition element 15 facing the cover element 40 are adapted relative to each other such that the partition elements 15, 45 form a partition section.

As can be further seen in FIGS. 26, 27, and 30, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element 35. The bottom element-associated partition element 35 comprises a bottom element-associated partition element holder 36.

The bottom element-associated partition element 35 is connected fixedly to the bottom element-associated resonator housing element 31.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section. Furthermore, the bottom element-associated partition element holder 36 and the section of the filter element-associated partition element 15 facing the bottom element 30 are adapted relative to each other such that the partition elements 15, 35 form a partition section.

As can be further seen in FIGS. 26, 27, 29, the bottom element-associated resonator housing element 31 projects with a section into the filter element-associated resonator housing receptacle 13.

As can be further seen in FIG. 27, the filter element-associated resonator housing element 11 comprises connection elements of a connection arrangement 29 which connects the resonator housing elements 11, 31, 41 to each other. The partition 25 is formed by the filter element-associated partition element 15, the cover element-associated partition element 45, and the bottom element-associated partition element 35.

Figure 31:
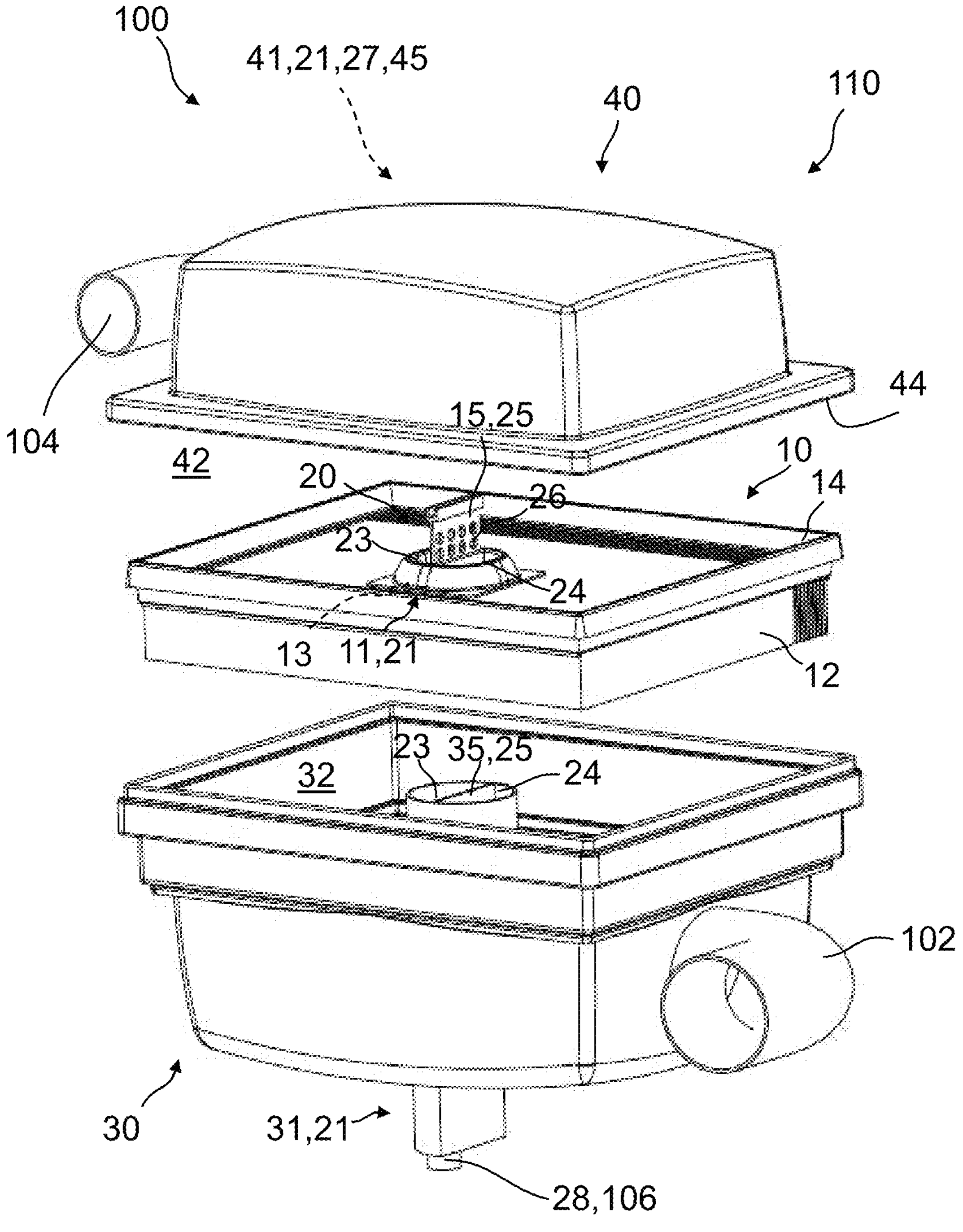
FIG. 31 shows an exploded view of a filter system according to a seventh embodiment of the invention with a filter element and two housing parts.
Figure 32:
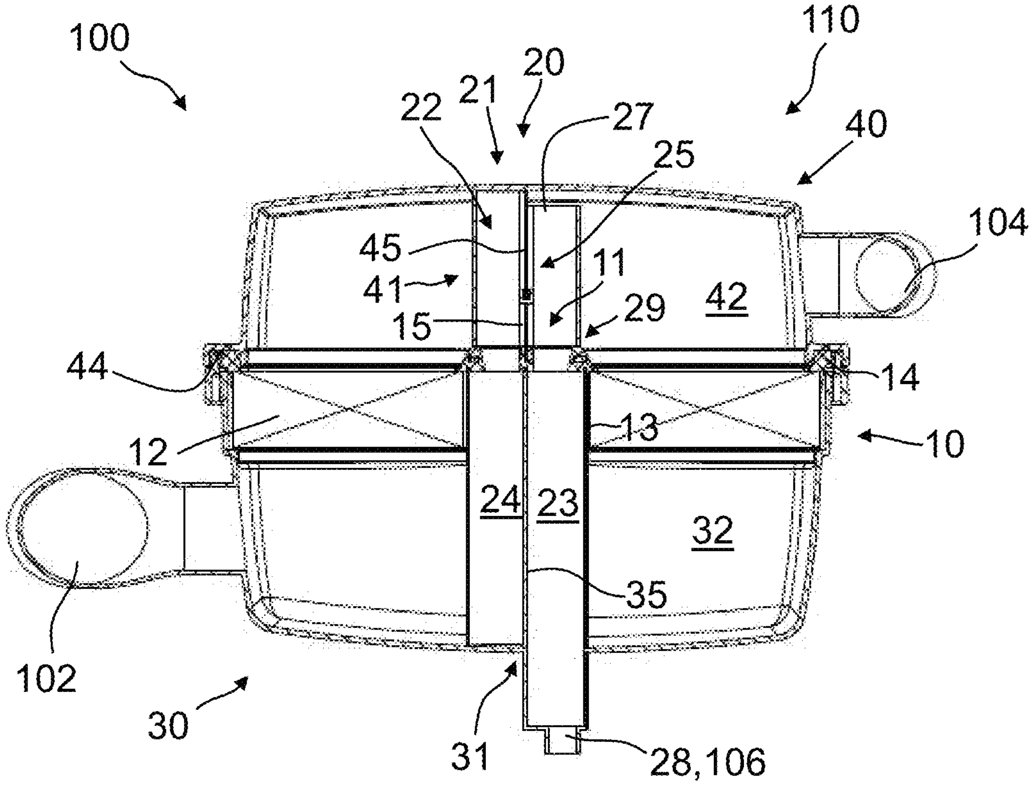
FIG. 32 shows a section illustration of the filter system of FIG. 31.
Figure 33:
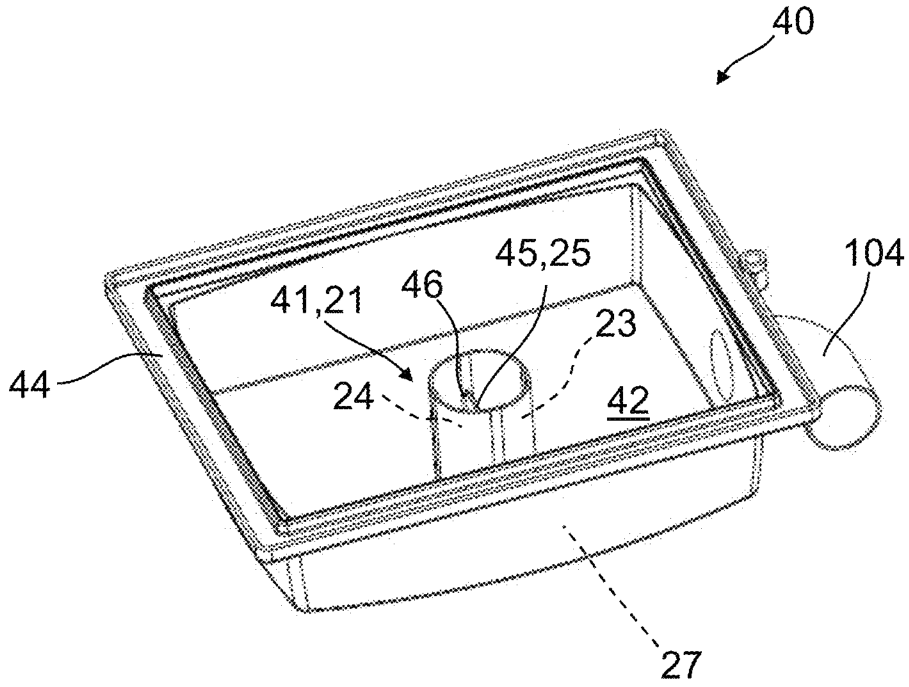
FIG. 33 shows an isometric view from below of a cover element of the filter system of FIGS. 31 and 32.
Figure 34:
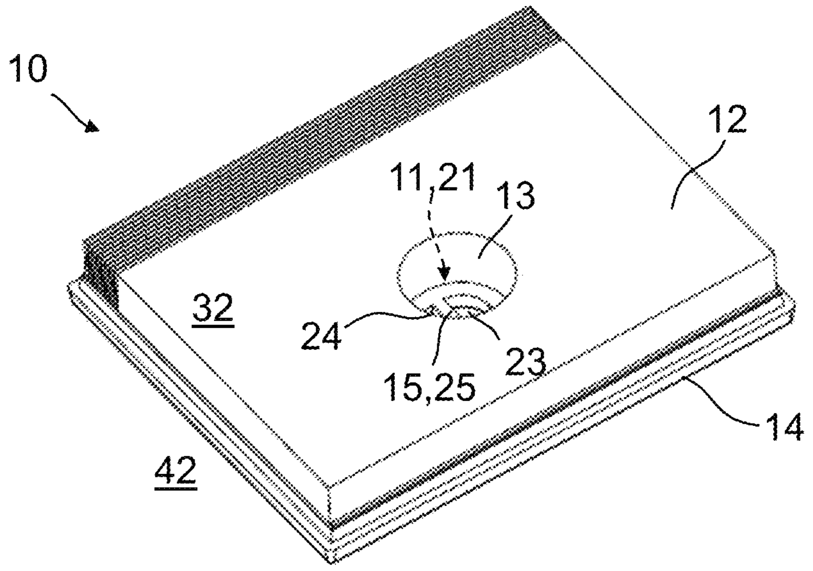
FIG. 34 shows an isometric view from below of a filter element of the filter system of FIGS. 31 and 32.
Figure 35:
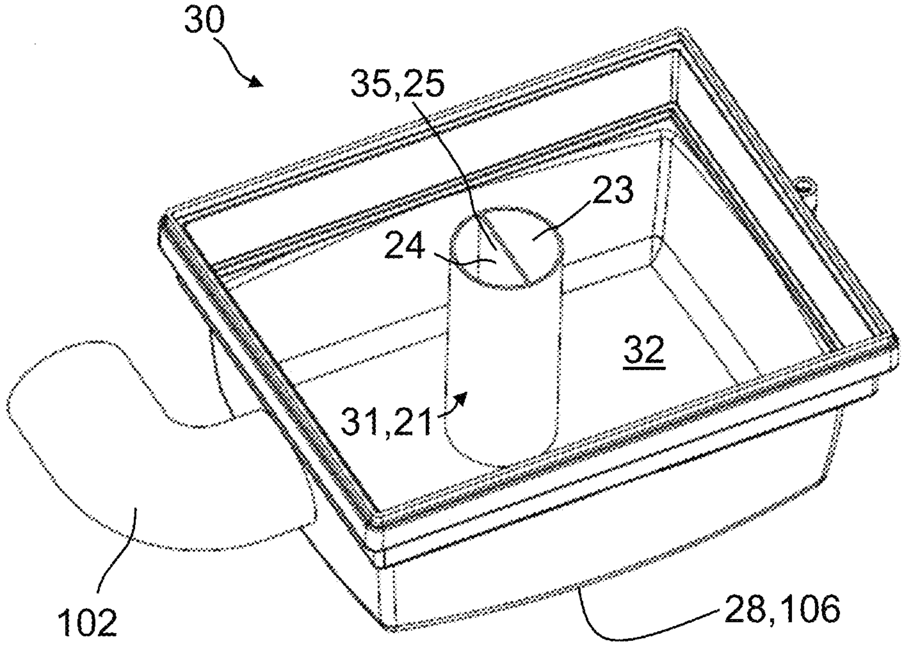
FIG. 35 shows an isometric view of a bottom element of the filter system of FIGS. 31 and 32.

FIGS. 31 to 35 show a filter system 100 according to a seventh embodiment of the invention. Here, FIG. 31 shows an exploded view of the filter system 100 with a filter element 10 and two housing parts 30, 40. FIG. 32 shows a section illustration of the filter system 100. FIG. 33 shows an isometric view from below of a cover element 40 of the filter system 100. FIG. 34 shows an isometric view from below of a filter element 10 of the filter system 100. FIG. 35 shows an isometric view from above of a bottom element 30 of the filter system 100. As can be seen in FIGS. 31 to 33, the cover element 40 comprises a cylinder-shaped, downwardly open cover element-associated resonator housing element 41. The cover element-associated resonator housing element 41 comprises a cover element-associated partition element 45 and the resonator inlet 27 which cannot be seen. The cover element-associated resonator housing element 41 is connected fixedly to the cover element 40. The cover element-associated partition element 45 is fixedly connected to the cover element-associated resonator housing element 41.

As can be further seen in FIG. 33, the cover element-associated partition element 45 has no passages 26. The cover element-associated partition element 45 comprises a cover element-associated partition element holder 46. In this context, in the cover element-associated resonator housing element 41 there is space for a section of the filter element-associated partition element 15. In this way, two partition elements 15, 45 connected to each other are arranged in the cover element-associated resonator housing element 41.

As can be seen in FIGS. 31, 32, and 34, the filter element 10 comprises an upwardly and downwardly open cylinder-shaped filter element-associated resonator housing element 11. The filter element-associated resonator housing element 11 comprises a minimal height and does not project out from the filter element-associated resonator housing receptacle 13. The filter element-associated resonator housing element 11 comprises a filter element-associated partition element 15 which comprises at an end region facing the cover element 40 a grid structure which forms the passages 26. The passages 26 comprise dimensions which are adapted to the at least one predetermined frequency of the resonator structure 20. Other shapes and numbers of the passages 26 are possible also.

The open end regions of the filter element-associated resonator housing element 11 and of the cover element-associated resonator housing element 41 which are facing each other are adapted relative to each other such that the resonator housing elements 11, 41 form a seal-tight resonator housing section. In addition, the end regions of the partition elements 15, 45 facing each other are adapted relative to each other.

As can be seen further in FIGS. 31, 32, and 35, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element 35.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 31, 32, 35, the bottom element-associated resonator housing element 31 projects with a section into the filter element-associated resonator housing receptacle 13.

As can be further seen in FIG. 32, the filter element-associated resonator housing element 11 and the end regions of the filter element-associated partition element 15 and of the cover element-associated partition element 45 comprise connection elements of a connection arrangement 29 which connects the partition elements 15, 35, 45 and the resonator housing elements 11, 31, 41 to each other. The partition 25 is formed by the filter element-associated partition element 15, the cover element-associated partition element 45, and the bottom element-associated partition element 35.

Figure 36:
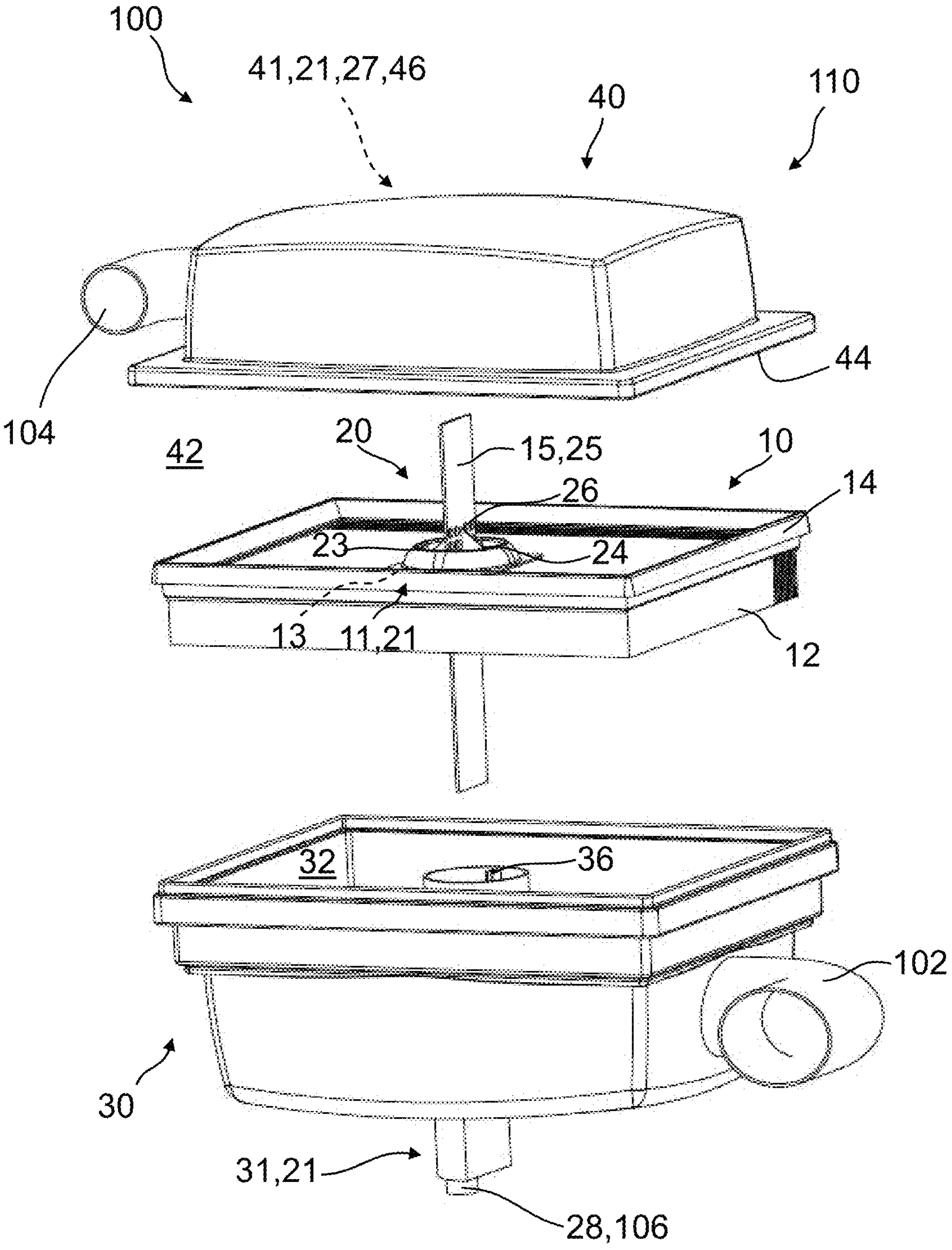
FIG. 36 shows an exploded view of a filter system according to an eighth embodiment of the invention with a filter element and two housing parts.
Figure 37:
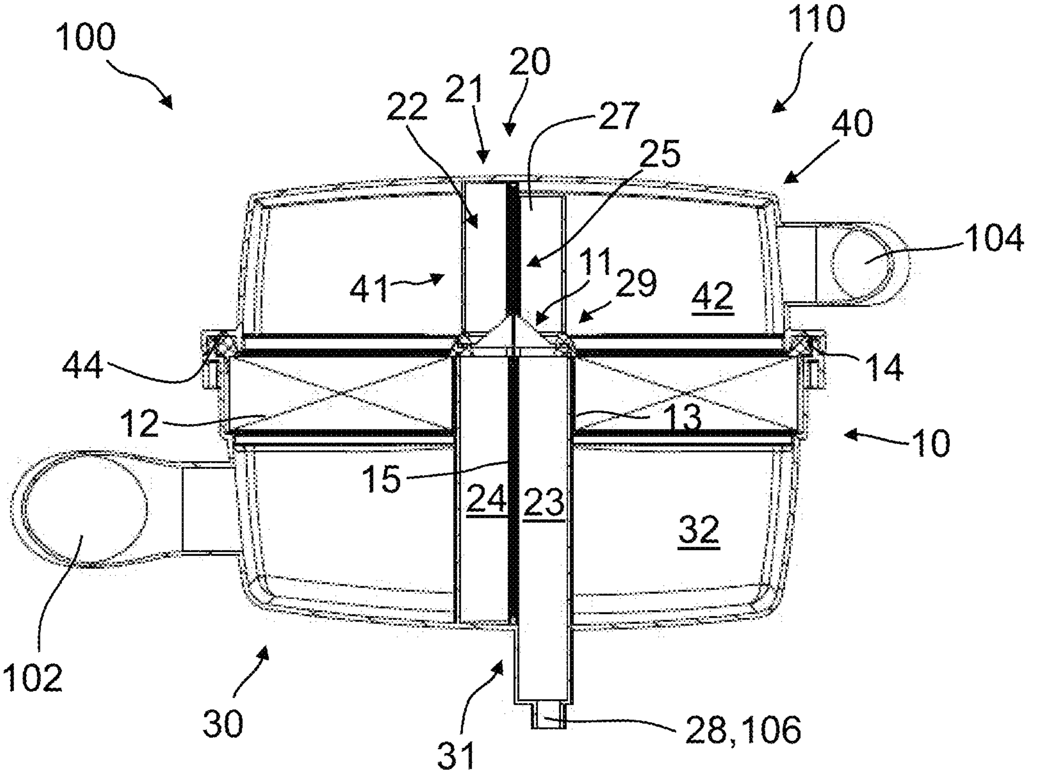
FIG. 37 shows a section illustration of the filter system of FIG. 36.
Figure 38:
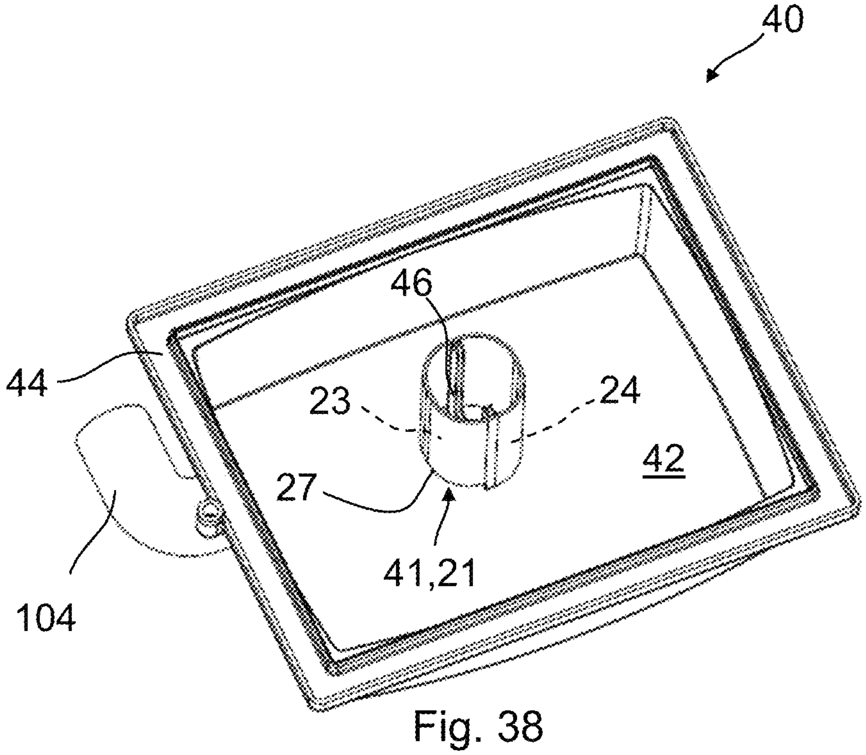
FIG. 38 shows an isometric view from below of a cover element of the filter system of FIGS. 36 and 37.
Figure 39:
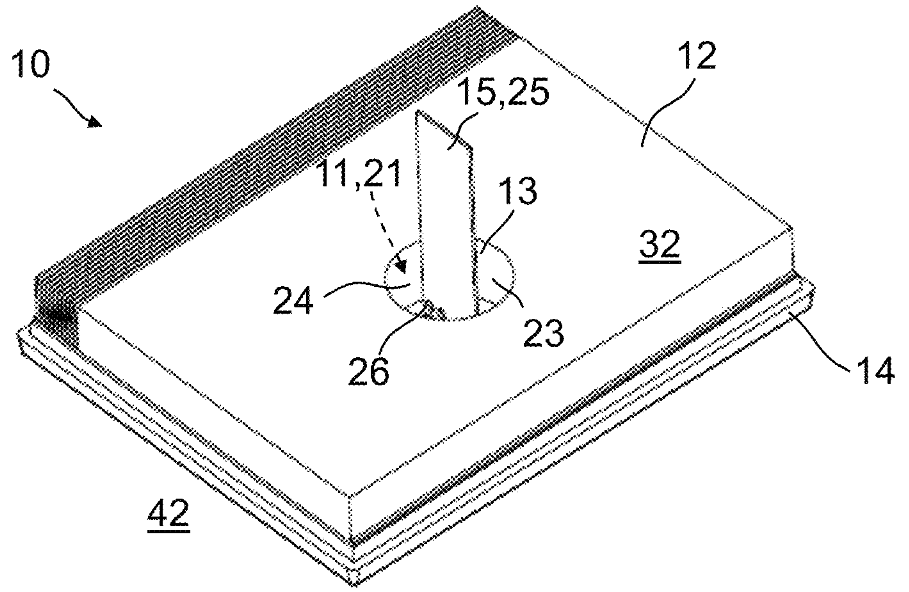
FIG. 39 shows an isometric view from below of a filter element of the filter system of FIGS. 36 and 37.
Figure 40:
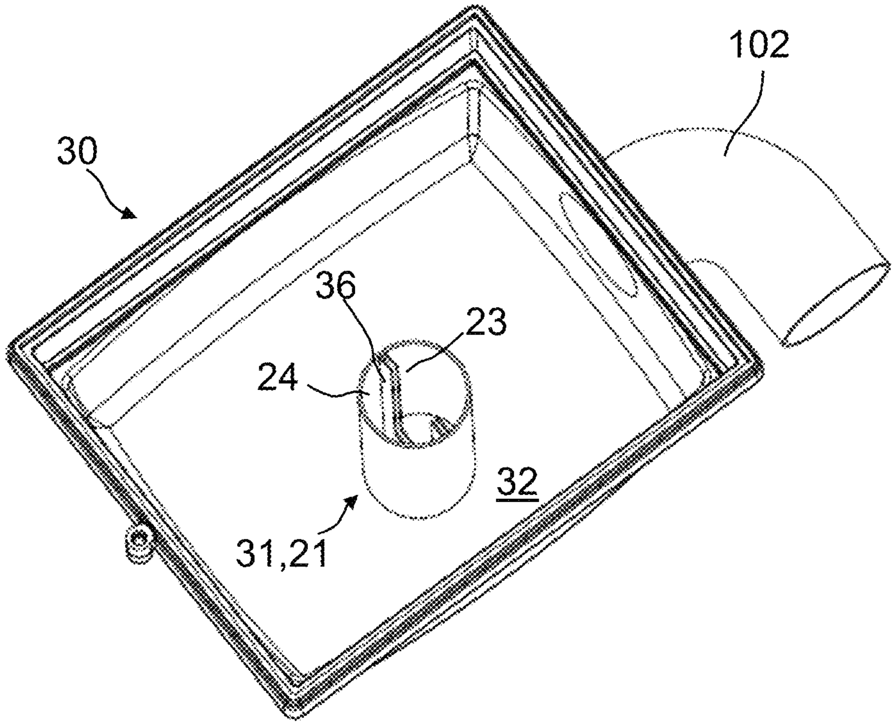
FIG. 40 shows an isometric view from above of a bottom element of the filter system of FIGS. 36 and 37.

FIGS. 36 to 40 show a filter system 100 according to an eighth embodiment of the invention. Here, FIG. 36 shows an exploded view of the filter system 100 with a filter element 10 and two housing parts 30, 40. FIG. 37 shows a section illustration of the filter system 100. FIG. 38 shows an isometric view from below of a cover element 40 of the filter system 100. FIG. 39 shows an isometric view from below of a filter element 10 of the filter system 100. FIG. 40 shows an isometric view from above of a bottom element 30 of the filter system 100.

As can be seen in FIGS. 36 to 40, the cover element 40 comprises a cylinder-shaped, downwardly open cover element-associated resonator housing element 41. The cover element-associated resonator housing element 41 comprises the resonator inlet 27 and a cover element-associated partition element holder 46. The cover element-associated resonator housing element 41 comprises no cover element-associated partition element. In this context, in the cover element-associated resonator housing element 41 there is space for a section of the filter element-associated partition element 15. In this way, only the filter element-associated partition element 15 is arranged in the cover element-associated resonator housing element 41 in an embodiment.

As can be seen in FIGS. 36, 37, and 39, the filter element 10 comprises an upwardly and downwardly open cylinder-shaped filter element-associated resonator housing element 11. The filter element-associated resonator housing element 11 has a minimal height and does not project out from the filter element-associated resonator housing receptacle 13.

The filter element-associated resonator housing element 11 comprises the filter element-associated partition element 15 which comprises a grid structure which forms the passages 26. The passages 26 comprise dimensions which are adapted to at least one predetermined frequency of the resonator structure 20. Other shapes and numbers of the passages 26 are possible.

The open end regions of the filter element-associated resonator housing element 11 and of the cover element-associated resonator housing element 41 which are facing each other are adapted relative to each other such that the resonator housing elements 11, 41 form a seal-tight resonator housing section. In addition, the filter element-associated partition element 15 is held in an embodiment by the cover element-associated partition element holder 46.

As can be further seen in FIGS. 36, 37, and 40, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element holder 36. The bottom element-associated resonator housing element 31 comprises no bottom element-associated partition element. In this context, in the bottom element-associated resonator housing element 31 there is space for a section of the filter element-associated partition element 15. In this way, only the filter element-associated partition element 15 is arranged in the bottom element-associated resonator housing element 31 in an embodiment.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 36, 37, 40, the bottom element-associated resonator housing element 31 projects with a section into the filter element-associated resonator housing receptacle 13.

As can be further seen in FIG. 37, the filter element-associated resonator housing element 11 comprises connection elements of a connection arrangement 29 which connects the resonator housing elements 11, 31, 41 to each other. The partition 25 is formed by the filter element-associated partition element 15.

Figure 41:
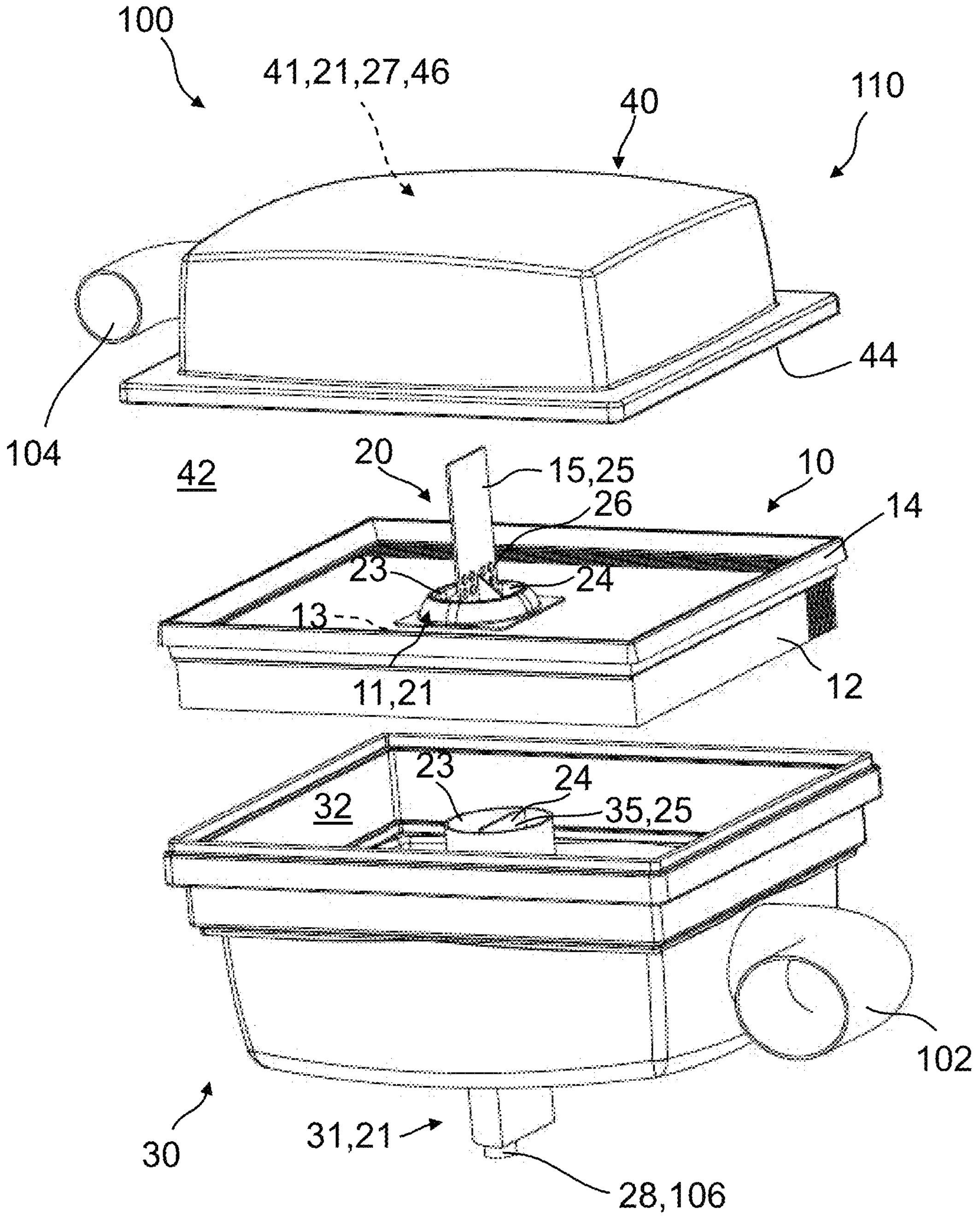
FIG. 41 shows an exploded view of the filter system according to a ninth embodiment of the invention with a filter element and two housing parts.
Figure 42:
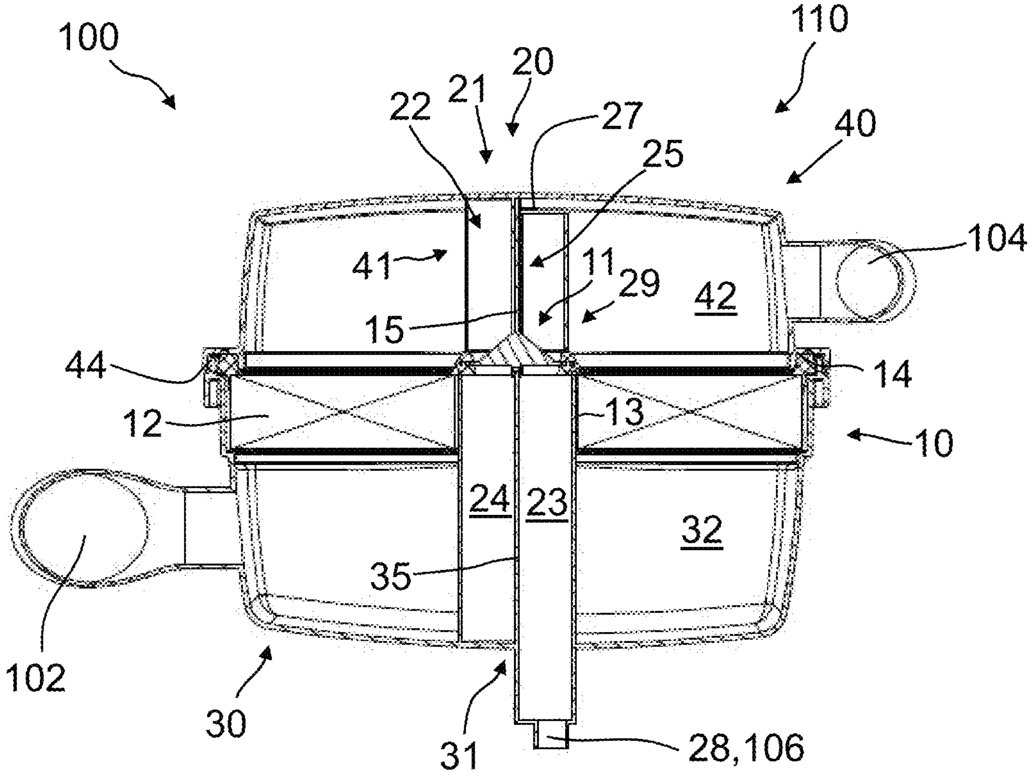
FIG. 42 shows a section illustration of the filter system of FIG. 41.
Figure 43:
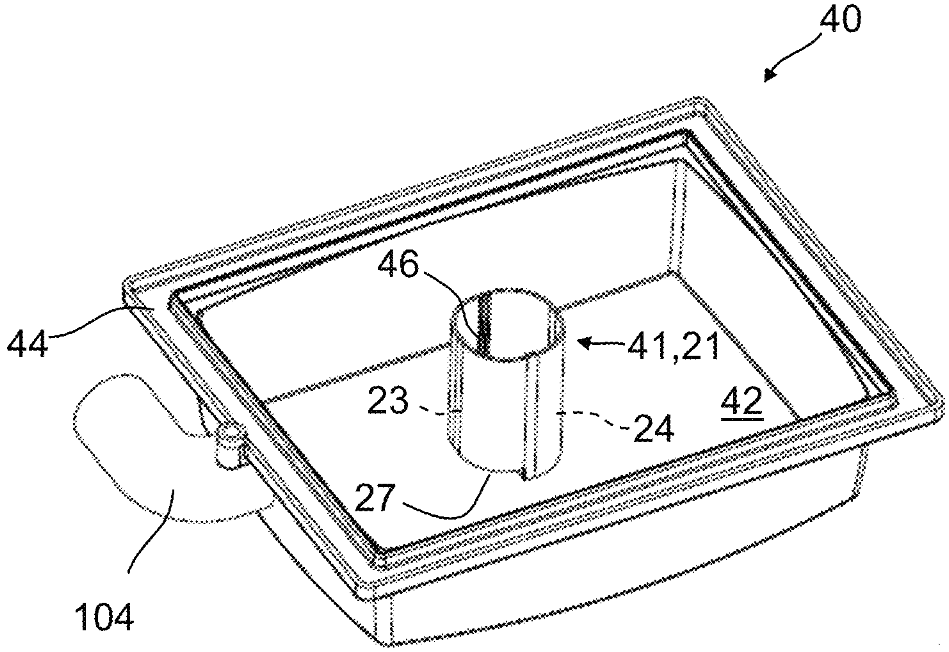
FIG. 43 shows an isometric view from below of a cover element of the filter system of FIGS. 41 and 42.
Figure 44:
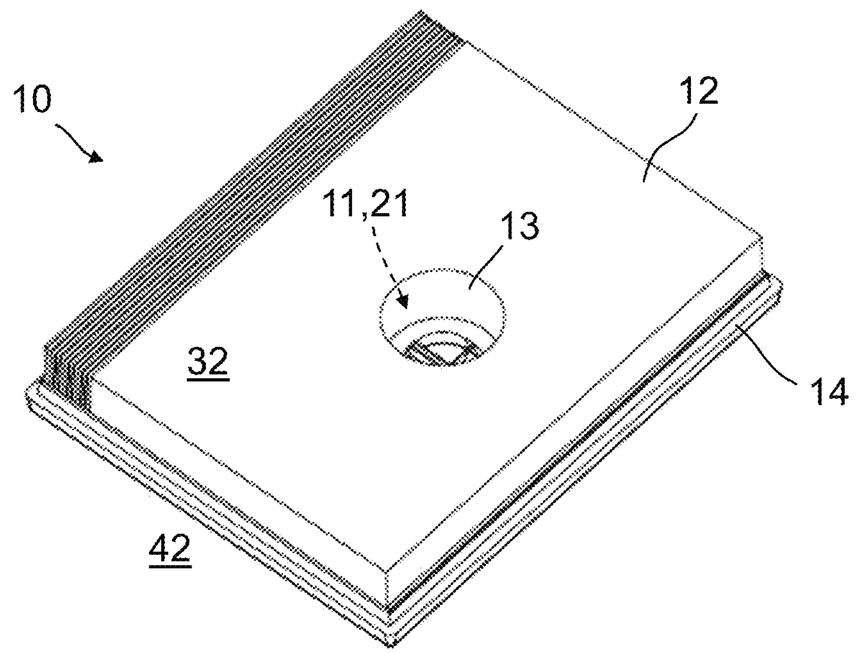
FIG. 44 shows an isometric view from below of a filter element of the filter system of FIGS. 41 and 42.
Figure 45:
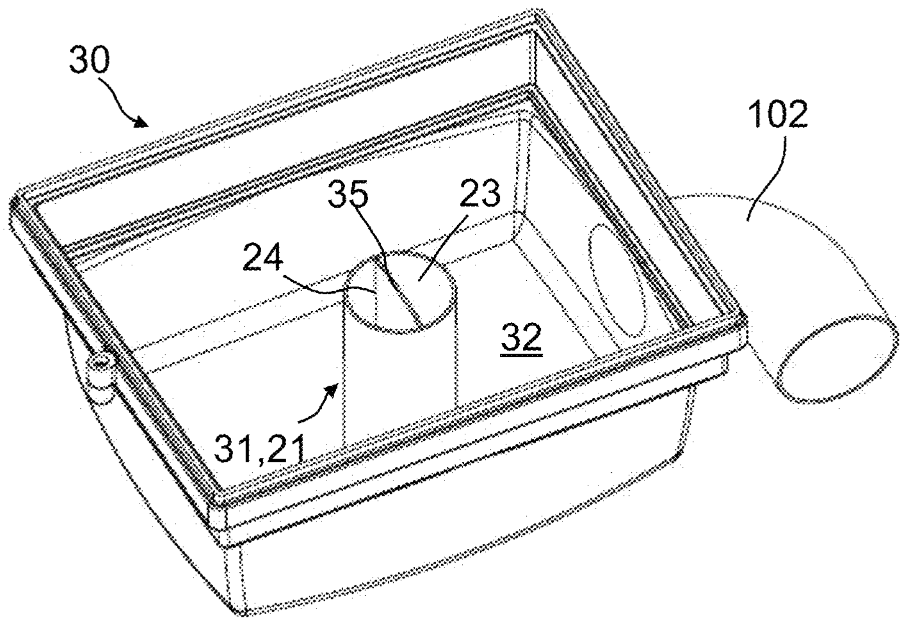
FIG. 45 shows an isometric view from above of a bottom element of the filter system according to FIGS. 41 and 42.

FIGS. 41 to 45 show a filter system 100 according to a ninth embodiment of the invention. Here, FIG. 41 shows an exploded view of the filter system 100 with a filter element 10 and two housing parts 30, 40. FIG. 42 shows a section illustration of the filter system 100. FIG. 43 shows an isometric view from below of a cover element 40 of the filter system 100. FIG. 44 shows an isometric view from below of a filter element 10 of the filter system 100. FIG. 45 shows an isometric view from above of a bottom element 30 of the filter system 100.

As can be seen in FIGS. 41 to 43, the cover element 40 comprises a cylinder-shaped, downwardly open cover element-associated resonator housing element 41. The cover element-associated resonator housing element 41 comprises the resonator inlet 27 and a cover-element-associated partition element holder 46. The cover element-associated resonator housing element 41 comprises no cover element-associated partition element. In this context, in the cover element-associated resonator housing element 41 there is space for a section of the filter element-associated partition element 15. In this way, only the filter element-associated partition element 15 is arranged in the cover element-associated resonator housing element 41 in an embodiment.

As can be seen in FIGS. 41, 42, and 44, the filter element 10 comprises an upwardly and downwardly open cylinder-shaped filter element-associated resonator housing element 11. The filter element-associated resonator housing element 11 comprises a minimal height and does not project out from the filter element-associated resonator housing receptacle 13. The filter element-associated resonator housing element 11 comprises the filter element-associated partition element 15 which comprises at an end region facing the filter element 10 a grid structure which forms the passages 26. The passages 26 have dimensions which are adapted to the at least one predetermined frequency of the resonator structure 20. Other shapes and numbers of the passages 26 are possible also.

The open end regions of the filter element-associated resonator housing element 11 and of the cover element-associated resonator housing element 41 which are facing each other are adapted relative to each other such that the resonator housing elements 11, 41 form a seal-tight resonator housing section. In addition, the filter element-associated partition element 15 in an embodiment is held by the cover element-associated partition element holder 46.

As can be further seen in FIGS. 41, 42, and 45, the bottom element 30 comprises a cylinder-shaped bottom element-associated resonator housing element 31. The bottom element-associated resonator housing element 31 comprises an opening which forms the auxiliary connection outlet 106 and the resonator outlet 28. In addition, the bottom element-associated resonator housing element 31 comprises a bottom element-associated partition element 35.

An open end region of the bottom element-associated resonator housing element 31 facing the filter element 10 is connected to the filter element-associated resonator housing element 11. The open end region of the filter element-associated resonator housing element 11 facing the bottom element 30 and the open end region of the bottom element-associated resonator housing element 31 facing the filter element 10 are adapted relative to each other such that the resonator housing elements 11, 31 form a seal-tight resonator housing section.

As can be further seen in FIGS. 41, 42, 45, the bottom element-associated resonator housing element 31 projects with a section into the filter element-associated resonator housing receptacle 13.

As can be further seen in FIG. 42, the filter element-associated resonator housing element 11 and the end regions of the filter element-associated partition element 15 and of the bottom element-associated partition element 35 comprise connection elements of a connection arrangement 29 which connects the partition elements 15, 35 and the resonator housing elements 11, 31, 41 to each other. The partition 25 is formed by the filter element-associated partition element 15 and the bottom element-associated partition element 35.

In an embodiment, not illustrated, other suitable shapes and dimensions of the frame 14 and/or of the folded bellows 12 and/or of the partition 25 and/or of the partition elements 15, 35, 45 and/or of the filter housing 110 and/or of the housing parts 30, 40 are possible. For example, the cross sections can have other shapes than the illustrated rectangular shapes.

In a further embodiment, not illustrated, in addition or as an alternative, other suitable shapes and dimensions of the resonator housing 21 and/or of the resonator housing elements 11, 31, 41 are possible. Instead of the cylinder-shaped configuration, also an angular configuration would be conceivable. The resonator housing 21 can also have an angular or oval or semicircular cross section instead of the round cross section.

REFERENCE CHARACTERS

10 filter element
11 filter element-associated resonator housing element
12 filter bellows
13 filter element-associated resonator housing receptacle
14 frame
15 filter element-associated partition element
20 resonator structure
21 multi-part resonator housing
22 cavity
23 first chamber
24 second chamber
25 (multi-part) partition (between chambers)
26 passage
27 resonator inlet
28 resonator outlet
29 connection arrangement between partition elements
30 bottom element
31 bottom element-associated resonator housing element
32 raw fluid region
33 bottom element-associated resonator housing receptacle (holder)
35 bottom element-associated partition element
36 bottom element-associated partition element holder
40 cover element
41 cover element-associated resonator housing element
42 clean fluid region
44 receiving region
45 cover element-associated partition element
46 cover element-associated partition element holder
100 filter system
102 main inlet
104 main outlet
106 auxiliary connection outlet fluidically coupled with 28
110 filter housing

What is claimed is:

1. A filter system comprising:

a filter housing enclosing an interior space;

a filter element exchangeably arranged in the interior space;

a resonator structure arranged in the interior space, wherein the resonator structure comprises resonator housing elements forming a closed resonator housing, wherein the resonator housing encloses a cavity;

a partition dividing the cavity into a first chamber and into a second chamber, wherein the partition comprises at least one passage through which the first chamber and the second chamber are acoustically coupled;

wherein the filter housing comprises a first housing part which comprises one of the resonator housing elements;

wherein the filter element comprises another one of the resonator housing elements;

wherein the filter element comprises a filter bellows;

wherein the filter element comprises a cutout, wherein the cutout penetrates the filter bellows and extends from an inflow side of the filter bellows all the way to an outflow side of the filter bellows;

wherein the cutout is a first resonator housing receptacle, wherein at least one of the resonator housing elements is arranged in the cutout.

2. The filter system according to claim 1, wherein the resonator housing comprises a resonator inlet and a resonator outlet, wherein the resonator inlet and the resonator outlet are coupled to the first chamber, wherein the resonator inlet is arranged in a clean fluid region of the interior space, and wherein the resonator outlet is coupled to an auxiliary connection outlet of the filter housing.

3. The filter system according to claim 2, wherein the at least one passage of the partition is arranged in a region of the resonator inlet.

4. The filter system according to claim 1, wherein the partition is embodied as a single part.

5. The filter system according to claim 1, wherein the partition is comprised of a plurality of partition elements forming the partition.

6. The filter system according to claim 5, wherein the plurality of partition elements include a first partition element, and wherein the resonator housing elements include a first resonator housing element and one or more second resonator housing elements, wherein the first partition element is connected to the first resonator housing element, projects out from the first resonator housing element, and projects into the one or more second resonator housing elements.

7. The filter system according to claim 6, wherein the one or more second resonator housing elements each comprise a partition element holder.

8. The filter system according to claim 5, wherein two or more of the resonator housing elements each are connected to one of the plurality of partition elements, respectively.

9. The filter system according to claim 1, wherein the filter housing parts include a second housing part comprising a second resonator housing receptacle, wherein one of the resonator housing elements projects at least partially into the second resonator housing receptacle.

10. The filter system according to claim 1, wherein at least one of the resonator housing elements encloses a cavity for the first chamber and the second chamber.

11. The filter system according to claim 1, wherein at least two of the resonator housing elements each enclose a cavity for the first chamber or for the second chamber, wherein the first chamber and the second chamber are adjacently arranged.

12. The filter system according to claim 1, wherein the filter element comprises a circumferentially extending frame.

13. The filter system according to claim 1, wherein the filter housing is of a two-part configuration comprised of the first housing part and of a second housing part, wherein one of the first and second housing parts is a bottom element comprising a first outlet, and wherein the other one of the first and second housing parts is a cover element, wherein the first outlet is an auxiliary connection outlet.

14. The filter system according to claim 13, wherein the bottom element comprises a main inlet of the filter housing, wherein the cover element comprises a second outlet of the filter housing, wherein the second outlet is a main outlet, wherein the filter element is arranged in a flow direction between the main inlet and the first and second outlets.

15. A method of using a filter element in the filter system according to claim 1, comprising:

providing a filter element comprising a filter bellows and comprising a cutout penetrating the filter bellows, wherein the cutout extends from an inflow side of the filter bellows all the way to an outflow side of the filter bellows and forms a resonator housing receptacle; and arranging at least one of the resonator housing elements of the resonator structure in the cutout of the filter element in an intended state.

* * * * *